(12) United States Patent
McRoberts

(10) Patent No.: US 11,926,051 B2
(45) Date of Patent: Mar. 12, 2024

(54) APPARATUS AND METHOD FOR CABLE-DRIVEN ROBOTICS

(71) Applicant: Cameron Reed McRoberts, Woodland Park, CO (US)

(72) Inventor: Cameron Reed McRoberts, Woodland Park, CO (US)

(*) Notice: Subject to any disclaimer, the term of this patent is extended or adjusted under 35 U.S.C. 154(b) by 655 days.

(21) Appl. No.: 17/251,646

(22) PCT Filed: Jun. 14, 2019

(86) PCT No.: PCT/US2019/037282
§ 371 (c)(1),
(2) Date: Dec. 11, 2020

(87) PCT Pub. No.: WO2019/241690
PCT Pub. Date: Dec. 19, 2019

(65) Prior Publication Data
US 2021/0276177 A1 Sep. 9, 2021

Related U.S. Application Data

(60) Provisional application No. 62/684,751, filed on Jun. 14, 2018.

(51) Int. Cl.
*B25J 9/00* (2006.01)
*B25J 9/10* (2006.01)
(Continued)

(52) U.S. Cl.
CPC .......... *B25J 9/0078* (2013.01); *B25J 9/1045* (2013.01); *B25J 15/0019* (2013.01); *B28B 1/001* (2013.01);
(Continued)

(58) Field of Classification Search
CPC .... B25J 9/0078; B25J 9/1045; B25J 15/0019; B33Y 30/00; B33Y 50/02; B25C 64/232;
(Continued)

(56) References Cited

U.S. PATENT DOCUMENTS 11,603,295 B2 * 3/2023 Garber ............ B66D 1/38
2004/0146388 A1 7/2004 Khajepour et al.
(Continued)

FOREIGN PATENT DOCUMENTS

EP 2982483 2/2016
FR 2910833 A1 * 7/2008 .......... B25J 17/0266

*Primary Examiner* — Gerald McClain
(74) *Attorney, Agent, or Firm* — Messner Reeves LLP; Scott J. Hawranek

(57) ABSTRACT

A cable-driven parallel robot (CDPR) includes at least two sets of rotors each coupled to a respective one of at least two supports. The sets of the rotors are positioned above a surface, an effector is positioned at a horizontal planar location between the sets of the rotors and at a vertical location above the surface. At least two sets of cables each have cables coupled to a respective one of the sets of the rotors at first ends of the respective set of the cables and to an effector at second ends of the respective set of the cables. Each set of the sets of rotors is configured to control tension to the respective one set of the sets of cables for moving the horizontal planar location. Each set of the sets of rotors is vertically movable on the respective one of the supports for moving the vertical location when the sets of rotors are vertically moved, e.g., moved synchronously.

19 Claims, 17 Drawing Sheets

(51) Int. Cl.
- *B25J 15/00* (2006.01)
- *B28B 1/00* (2006.01)
- *B28B 17/00* (2006.01)
- *B29C 64/232* (2017.01)
- *B29C 64/236* (2017.01)
- *B29C 64/393* (2017.01)
- *B33Y 30/00* (2015.01)
- *B33Y 50/02* (2015.01)
- *B66D 1/82* (2006.01)
- *G01S 17/08* (2006.01)

(52) U.S. Cl.
CPC ........ *B28B 17/0081* (2013.01); *B29C 64/232* (2017.08); *B29C 64/236* (2017.08); *B29C 64/393* (2017.08); *B33Y 30/00* (2014.12); *B33Y 50/02* (2014.12); *B66D 1/82* (2013.01); *G01S 17/08* (2013.01)

(58) Field of Classification Search
CPC ..... B25C 64/393; B25C 64/236; B28B 1/001; B28B 17/0081; B66D 1/82; G01S 17/08
USPC ..... 264/308, 37.29, 497; 414/537, 539, 540, 414/546, 624; 246/28 R, 33, 34 A, 39, 46
See application file for complete search history.

(56) References Cited

U.S. PATENT DOCUMENTS

| | | | |
|---|---|---|---|
| 2014/0312808 A1 | 10/2014 | Szarzynski | |
| 2016/0001443 A1* | 1/2016 | Davis | A63G 31/16 74/490.08 |
| 2017/0095973 A1 | 4/2017 | Chamberlain et al. | |
| 2018/0178397 A1* | 6/2018 | Long | B25J 9/0078 |
| 2019/0152051 A1* | 5/2019 | Bramberger | B33Y 30/00 |

* cited by examiner

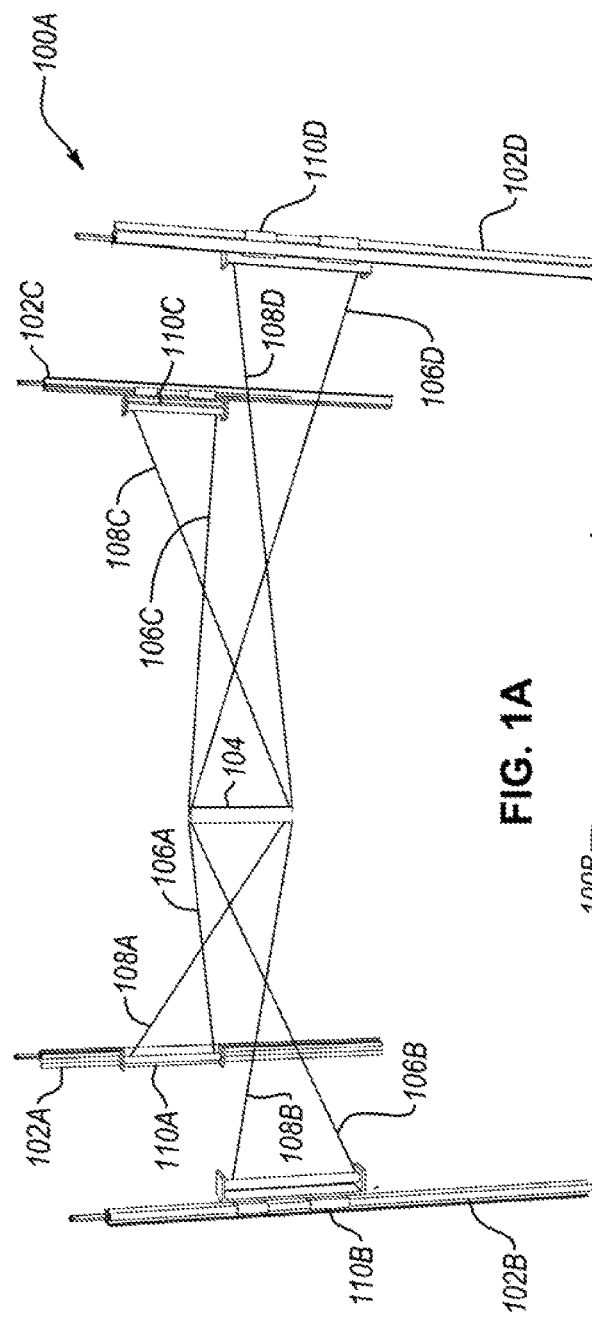
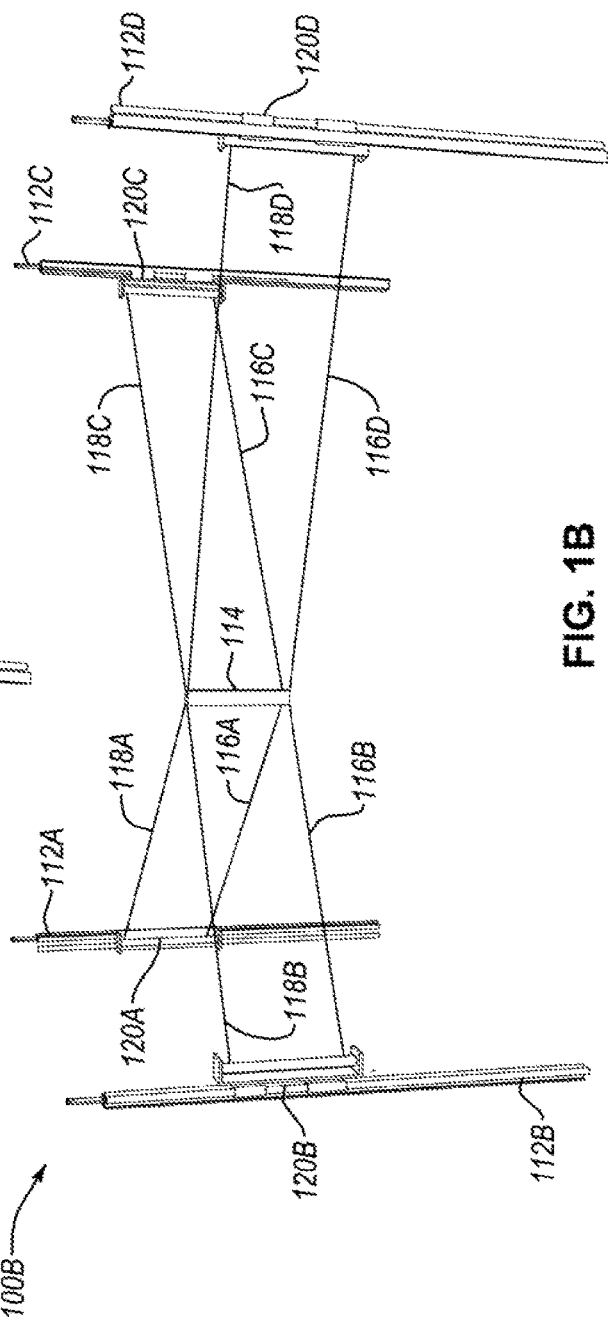
FIG. 1A
FIG. 1B

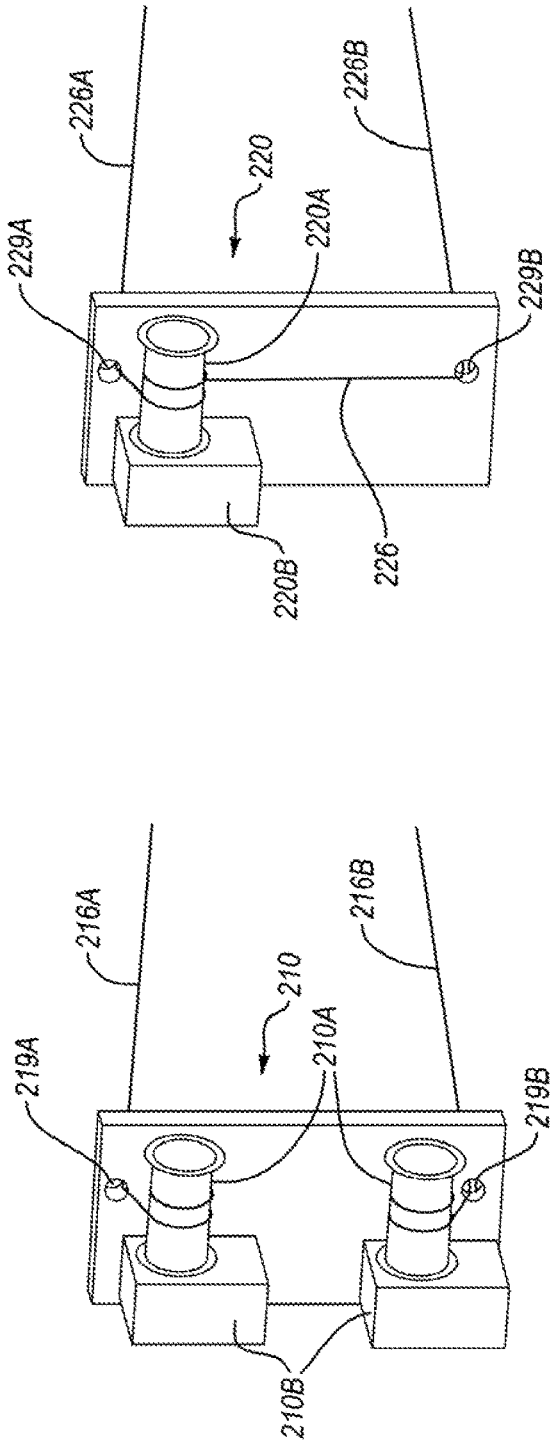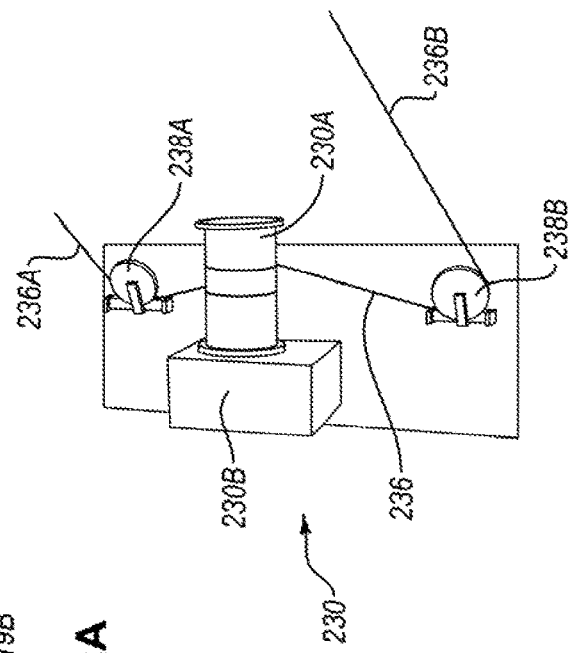
FIG. 2A
FIG. 2B
FIG. 2C

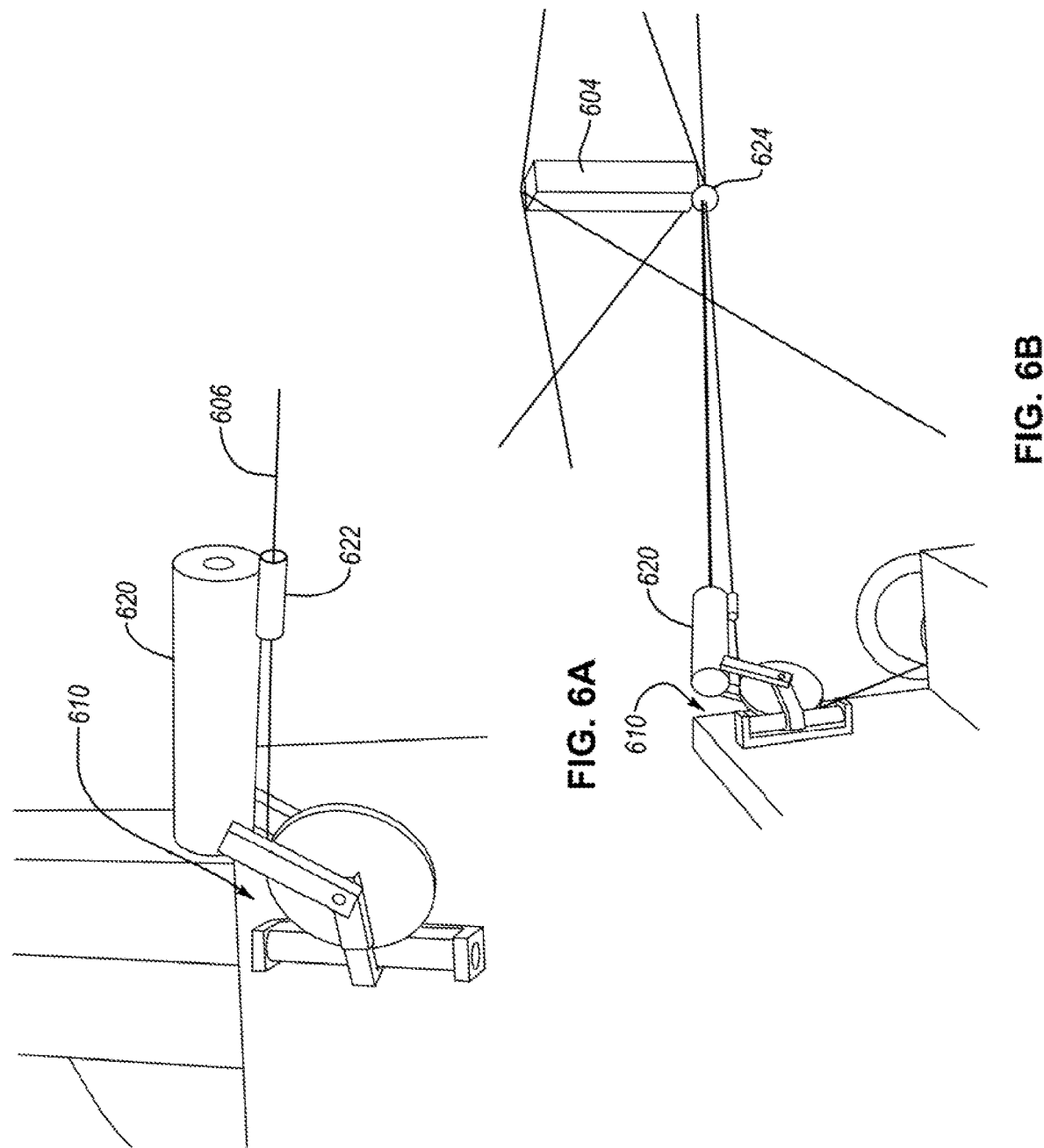

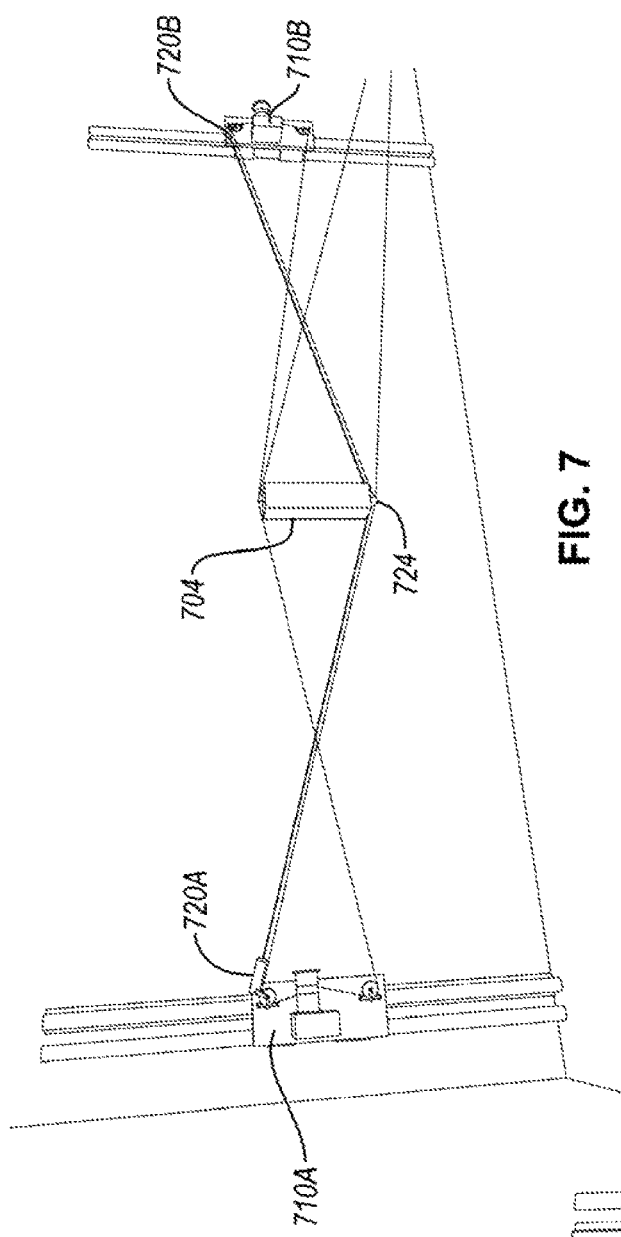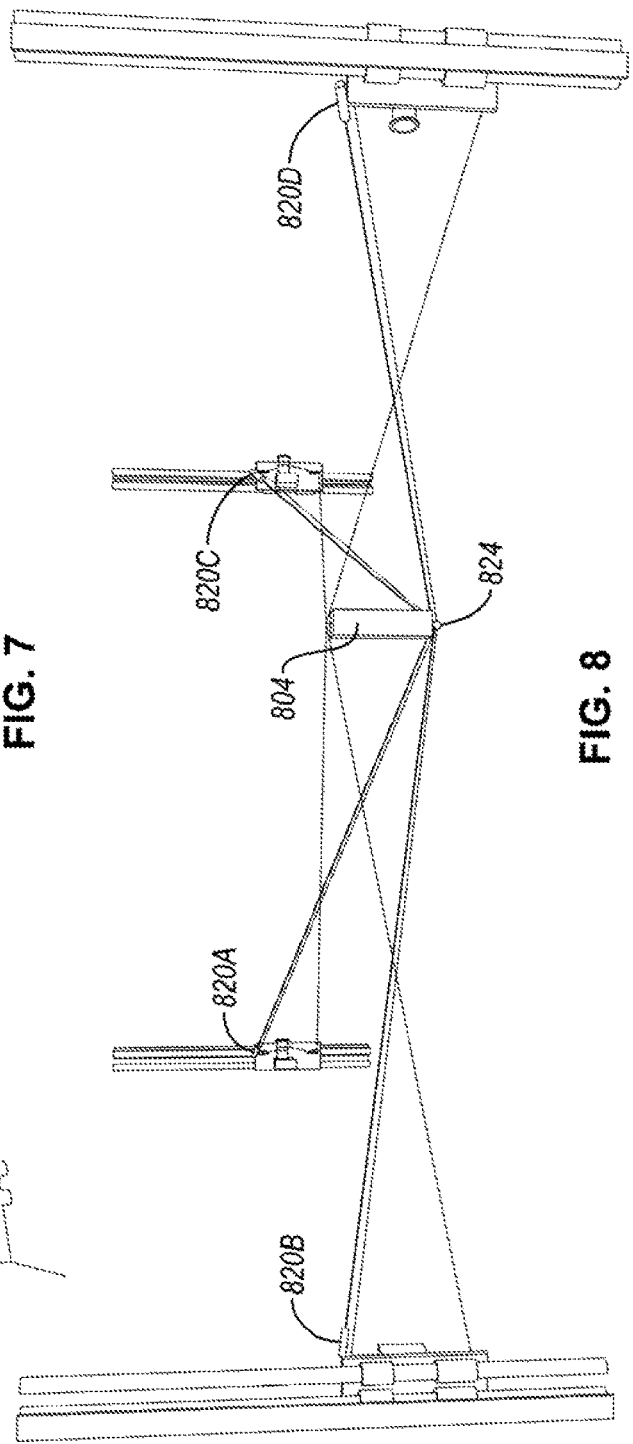

APPARATUS AND METHOD FOR CABLE-DRIVEN ROBOTICS

CROSS REFERENCE TO RELATED APPLICATIONS

The present application is a national stage, under 35 U.S.C. § 371, of International Application No. PCT/US2019/037282 having an international filing date of Jun. 14, 2019, which claims the benefits of and priority, under 35 U.S.C. § 119(e), to U.S. Provisional Application Ser. No. 62/684,751, filed Jun. 14, 2018, each of the above-identified applications being fully incorporated herein by reference.

BACKGROUND OF THE INVENTION

Field of the Invention

The present invention generally relates to cable-driven guides, and more particularly to an apparatus and method for cable-driven robotics.

Description of the Related Art

Conventional three-dimensional (3D) printers typically employ a pair of rigid, perpendicular, horizontal beams. The print head is attached at the intersection of the beams and is moved in the two Cartesian directions (X and Y or forward/back and left/right) as one beam is moved in the X direction and the other beam is moved in the Y direction. Movement in the third dimension, Z, is achieved by moving both beams the Z direction (up or down).

There are deficiencies in the related art. As the size of the print space increases, there is a corresponding increase in the weight of the beams and the necessary mechanisms to move them, including motors. Moreover, as the weight increases, the inertia that needs to be overcome increases and the speed of the printer decreases. Accuracy may also suffer. For example, a Cartesian printer spanning 30 feet by 30 feet would require two 30-foot long cross beams and track (each weighing about 300 pounds) as well as equally long roller chains or threaded rods and sufficiently powerful motors for moving the print head along the track. Consequently, there is a practical limit to the size of an object that a conventional 3D printer is able to create, such as four feet by four feet.

A cable-driven robot employs sets of flexible cables suspended between corresponding sets of opposing motors and end-effectors attached to an outer frame. By synchronizing the operation of the motors, an object suspended from the cables may be positioned anywhere in the 3D space within the perimeter of the frame. Cables are significantly lighter than rigid beams and, therefore, a cable-driven 3D printer may be significantly larger. However, one drawback to extra-large format cable-driven parallel robot (CDPR) systems is that as the length of the cables increases, the sag in the cable also increases. Temperature variations and shifting of tension forces also affect the actual length of the cables. Consequently, the exact position of the print head may be difficult to determine, thus affecting the accuracy of the device.

SUMMARY OF THE INVENTION

Accordingly, embodiments of the invention are directed to an apparatus and method for cable-driven robotics that substantially obviate one or more of the problems due to limitations and disadvantages of the related art.

An advantage of an embodiment is to provide an enclosable, lightweight, quickly deployable cable driven robot with high speed and accurate for multiple applications including 3D printing and construction.

Another advantage of an embodiment is to provide a cable driven robot with well-regulated cable tension and load distribution.

Additional features and advantages of the invention set forth in the description which follows and in the art will be apparent from the description, or may be learned by practice of the invention. The objectives and other advantages of the invention will be realized and attained by the structure particularly pointed out in the written description and claims hereof as well as the appended figures.

In an embodiment, a cable-driven parallel robot (CDPR) includes a first rotor coupled to a first support, the first rotor positioned above a surface; a second rotor coupled to a second support, the second rotor positioned above the surface; an effector positioned at a horizontal planar location between the first rotor and the second rotor and at a vertical location above the surface; a first set of cables coupled to the first rotor at first ends of the first set of the cables and to the effector at second ends of the first set of the cables; and a second set of cables coupled to the second rotor at first ends of the second set of the cables and to the effector at second ends of the second set of the cables. The first rotor controls tension to the first set of cables and the second rotor controls tension to the second set of cables for moving the horizontal planar location. The first rotor is vertically movable on the first support with the second rotor is vertically movable on the second support for moving the vertical location when the first rotor is vertically moved on the first support synchronous to the second rotor being vertically moved on the second support.

In another embodiment, a cable-driven parallel robot (CDPR) includes a first set of rotors coupled to a first support, the first set of the rotors positioned above a surface; a second set rotors coupled to a second support, the second set of the rotors positioned above the surface; an effector positioned at a horizontal planar location between the first set of the rotors and the second set of the rotors and at a vertical location above the surface; a first set of cables coupled to the first set of the rotors at first ends of the first set of the cables and to the effector at second ends of the first set of the cables; and a second set of two cables coupled to the second set of the rotors at first ends of the second set of the cables and to the effector at second ends of the second set of the cables. The first set of the rotors controls tension to the first set of cables and the second set of the rotors controls tension to the second set of cables for moving the horizontal planar location. The first set of the rotors is vertically movable on the first support with the second set of the rotors is vertically movable on the second support for moving the vertical location when the first set of the rotors is vertically moved on the first support synchronous to the second set of rotors being vertically moved on the second support.

In yet another embodiment, a cable-driven parallel robot (CDPR) includes at least two sets of rotors each coupled to a respective one of at least two supports, the sets of the rotors positioned above a surface; an effector positioned at a horizontal planar location between the sets of the rotors and at a vertical location above the surface; and at least two sets of cables each coupled to a respective one of the sets of the rotors at first ends of the respective set of the cables and to the effector at second ends of the respective set of the cables. Each set of the sets of the rotors controls tension to the respective one set of the sets of the cables for moving the horizontal planar location. Each set of the sets of the rotors is vertically movable on the respective one of the supports for moving the vertical location when the sets of the rotors are vertically moved synchronously.

In further embodiments, each set of the sets of the rotors comprises two rotors, and wherein at least one cable of the respective set of the cables is coupled to one of the two rotors and at least another one cable of the respective set of the cables is coupled to another one of the two rotors. At least one cable of each set of the cables is coupled to an upper portion of the effector and at least another one cable of each set of the cables is coupled to a lower portion of the effector. At least one cable of each set of the cables is coupled to an upper portion of the effector and at least another one cable of each set of the cables is coupled to a lower portion of the effector, and wherein the first end of the at least one cable is coupled to an upper portion of a rotor and the first end of the at least another one cable is coupled to a lower portion of the rotor. At least one cable of each set of the cables is coupled to an upper portion of the effector and at least another one cable of each set of the cables is coupled to a lower portion of the effector, and wherein the first end of the at least one cable is coupled to an lower portion of a rotor and the first end of the at least another one cable is coupled to a upper portion of the rotor. At least one cable of at least one set of the cables is coupled to an upper portion of the effector and at least another one cable of the at least one set of the cables is coupled to a lower portion of the effector, wherein the first end of the at least one cable of at least one set of the cables is coupled to an lower portion of a rotor and the first end of the at least another one cable of at least one set of the cables is coupled to a upper portion of the rotor, wherein at least one cable of at least another set of the cables is coupled to an upper portion of the effector and at least another one cable of the at least another set of the cables is coupled to a lower portion of the effector, wherein the first end of the at least another cable of the at least another set of the cables is coupled to an upper portion of a rotor and the first end of the at least another one cable is coupled to a lower portion of the rotor. The CDPR further includes at least one pulley; wherein at least one cable of at least one set of the cables is coupled a rotor through the pulley. The CDPR further includes at least one thread hole; wherein at least one cable of at least one set of the cables is coupled a rotor through the thread hole. The CDPR further includes at least one laser configured for measuring a distance of the effector and at least one reflector coupled to the effector. At least one of the rotors comprises a winch drum. At least one of the rotors comprises a winch drum, wherein the winch drum is configured to coil at least one of the cables for adjusting a length of the at least one cable. At least one of the rotors comprises a winch drum, and wherein the winch drum is configured to coil at least one cable of one set of the cables and at least another cable of the one set of the cables. At least one of the rotors comprises a winch drum, wherein the winch drum comprises a first set of grooves and a second set of grooves across a portion of length of the winch drum, wherein the first set of grooves in placed at an opposite orientation from the second set of grooves, and wherein the winch drum is configured to coil at least one cable of one set of the cables using the first set of grooves and at least another cable of the one set of the cables using the second set of the grooves. At least one of the rotors comprises a winch drum, wherein the winch drum comprises a set of grooves, and wherein each of the set of grooves is offset at an angle along the length of the winch drum. At least one of the rotors comprises a winch drum, wherein the winch drum comprises a set of grooves, wherein each of the set of grooves is offset at an angle along the length of the winch drum, and wherein the cables are offset at the angle to a plane of the horizontal planar location. The CDPR further includes computational equipment configured for controlling at least one of the rotors. The CDPR further includes computational equipment configured for controlling at least one of the rotors, wherein the controlling comprises activating the at least one rotor for adjusting a length of a cable coupled to the rotor to move the horizontal planar location. The CDPR further includes computational equipment configured for calibrating the CDPR for moving the effector in a volume area, wherein the horizontal planar location and the vertical location is within the volume area. The CDPR further includes at least one counterweight. The CDPR further includes a material feed system coupled to the effector. The effector comprises a printhead.

In an embodiment, a method of controlling a cable-driven parallel robot (CDPR) includes providing a first rotor coupled to a first support, the first rotor positioned above a surface; providing a second rotor coupled to a second support, the second rotor positioned above the surface; providing an effector positioned at a horizontal planar location between the first rotor and the second rotor and at a vertical location above the surface; providing a first set of cables coupled to the first rotor at first ends of the first set of the cables and to the effector at second ends of the first set of the cables; providing a second set of cables coupled to the second rotor at first ends of the second set of the cables and to the effector at second ends of the second set of the cables; moving the effector to a next horizontal planar location by controlling tension to the first set of cables by the first rotor and the second set of cables by the second rotor, and moving the effector vertically by vertically moving the first rotor on the first support and the second rotor on the second support synchronously.

In another embodiment, a method of controlling a cable-driven parallel robot (CDPR) includes providing a first set of rotors coupled to a first support, the first set of the rotors positioned above a surface; providing a second set rotors coupled to a second support, the second set of the rotors positioned above the surface; providing an effector positioned at a horizontal planar location between the first set of the rotors and the second set of the rotors and at a vertical location above the surface; providing a first set of cables coupled to the first set of the rotors at first ends of the first set of the cables and to the effector at second ends of the first set of the cables; providing a second set of two cables coupled to the second set of the rotors at first ends of the second set of the cables and to the effector at second ends of the second set of the cables; moving the effector to a next horizontal planar location by controlling tension to the first set of cables by the first set of the rotors controls and the second set of cables by the second set of the rotors; and moving the effector vertically by vertically moving the first set of the rotors on the first support and the second set of the rotors on the second support synchronously.

In yet another embodiment, a method of controlling a cable-driven parallel robot (CDPR) includes providing at least two sets of rotors each coupled to a respective one of at least two supports, the sets of the rotors positioned above a surface; providing an effector positioned at a horizontal planar location between the sets of the rotors and at a vertical location above the surface; providing at least two sets of cables each coupled to a respective one of the sets of the rotors at first ends of the respective set of the cables and to the effector at second ends of the respective set of the cables; moving the effector to a next horizontal planar location by controlling tension to each of the sets of the cables teach by a respective set of the sets of the rotors; and moving the effector vertically by vertically moving each set of the sets of the rotors on the respective one of the supports synchronously.

In further embodiments, each set of the sets of the rotors comprises two rotors, and wherein at least one cable of the respective set of the cables is coupled to one of the two rotors and at least another one cable of the respective set of the cables is coupled to another one of the two rotors. At least one cable of each set of the cables is coupled to an upper portion of the effector and at least another one cable of each set of the cables is coupled to a lower portion of the effector. At least one cable of each set of the cables is coupled to an upper portion of the effector and at least another one cable of each set of the cables is coupled to a lower portion of the effector, and wherein the first end of the at least one cable is coupled to an upper portion of a rotor and the first end of the at least another one cable is coupled to a lower portion of the rotor. At least one cable of each set of the cables is coupled to an upper portion of the effector and at least another one cable of each set of the cables is coupled to a lower portion of the effector, and wherein the first end of the at least one cable is coupled to a lower portion of a rotor and the first end of the at least another one cable is coupled to an upper portion of the rotor. At least one cable of at least one set of the cables is coupled to an upper portion of the effector and at least another one cable of the at least one set of the cables is coupled to a lower portion of the effector, wherein the first end of the at least one cable of at least one set of the cables is coupled to a lower portion of a rotor and the first end of the at least another one cable of at least one set of the cables is coupled to an upper portion of the rotor, wherein at least one cable of at least another set of the cables is coupled to an upper portion of the effector and at least another one cable of the at least another set of the cables is coupled to a lower portion of the effector, wherein the first end of the at least another cable of the at least another set of the cables is coupled to an upper portion of a rotor and the first end of the at least another one cable is coupled to a lower portion of the rotor. The method further includes providing at least one pulley; wherein at least one cable of at least one set of the cables is coupled a rotor through the pulley. The method further includes providing at least one thread hole; wherein at least one cable of at least one set of the cables is coupled a rotor through the thread hole. The method further includes providing at least one laser; and measuring a distance of the effector using the at least one laser. The method further includes providing at least one laser and at least one reflector coupled to the effector; and measuring a distance of the effector using the at least one laser. At least one of the rotors comprises a winch drum. At least one of the rotors comprises a winch drum, and the method further includes coiling at least one of the cables using the winch drum for adjusting a length of the at least one cable. At least one of the rotors comprises a winch drum, and the method further includes coiling at least one cable of one set of the cables and at least another cable of the one set of the cables using the winch drum. At least one of the rotors comprises a winch drum, wherein the winch drum comprises a first set of grooves and a second set of grooves across a portion of length of the winch drum, and wherein the first set of grooves in placed at an opposite orientation from the second set of grooves, and the method further includes coiling at least one cable of one set of the cables using the first set of grooves and at least another cable of the one set of the cables using the second set of the grooves. At least one of the rotors comprises a winch drum, wherein the winch drum comprises a set of grooves, and wherein each of the set of grooves is offset at an angle along the length of the winch drum. At least one of the rotors comprises a winch drum, wherein the winch drum comprises a set of grooves, wherein each of the set of grooves is offset at an angle along the length of the winch drum, and wherein the cables are offset at the angle to a plane of the horizontal planar location. The moving the effector to the next horizontal planar location comprises controlling at least one of the rotors using computational equipment. The moving the effector to the next horizontal planar location comprises controlling at least one of the rotors using computational equipment, and wherein the controlling comprises activating the at least one rotor for adjusting a length of a cable coupled to the rotor to move the horizontal planar location. The method further includes calibrating the CDPR for moving the effector in a volume area using computational equipment, wherein the horizontal planar location and the vertical location is within the volume area. The method further includes calibrating the CDPR for moving the effector in a volume area using computational equipment; providing at least one laser; and measuring a distance of the effector using the at least one laser, wherein the horizontal planar location and the vertical location is within the volume area. The method further includes providing at least one counterweight. The method further includes providing a material feed system coupled to the effector. The effector comprises a printhead.

It is to be understood that both the foregoing general description and the following detailed description are exemplary and explanatory and are intended to provide further explanation of the invention as claimed.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible, utilizing, alone or in combination, one or more of the features set forth above or described in detail below.

BRIEF DESCRIPTION OF THE FIGURES

The accompanying figures, which are included to provide a further understanding of the invention, are incorporated in and constitute a part of this specification and illustrate embodiments of the invention and together with the description serve to explain the principles of the invention.

FIG. 1A illustrates a schematic view of a cable-driven parallel robot (CDPR) with the cables in an X-configuration, according to an embodiment;

FIG. 1B illustrates a schematic view of a CDPR, with the cables in a non-crossing configuration, according to an embodiment;

FIG. 2A illustrates a view of an exemplary two-motor configuration of a CDPR according to an embodiment;

FIG. 2B illustrates a view of an exemplary single-motor configuration of a CDPR according to an embodiment;

FIG. 2C illustrates a view of an exemplary variation of the single-motor configuration of a CDPR according to an embodiment;

FIG. 6A illustrates a close-up perspective view of a laser positioning device mounted to a rotor/motor device according to an embodiment;

FIG. 6B illustrates a broader perspective view a CDPR with the laser positioning device of FIG. 6A;

FIG. 7 illustrates a perspective view of a CDPR employing two laser positioning devices according to an embodiment;

FIG. 8 illustrates a perspective view of a CDPR employing four laser positioning devices according to an embodiment;

DETAILED DESCRIPTION

Figure 3:
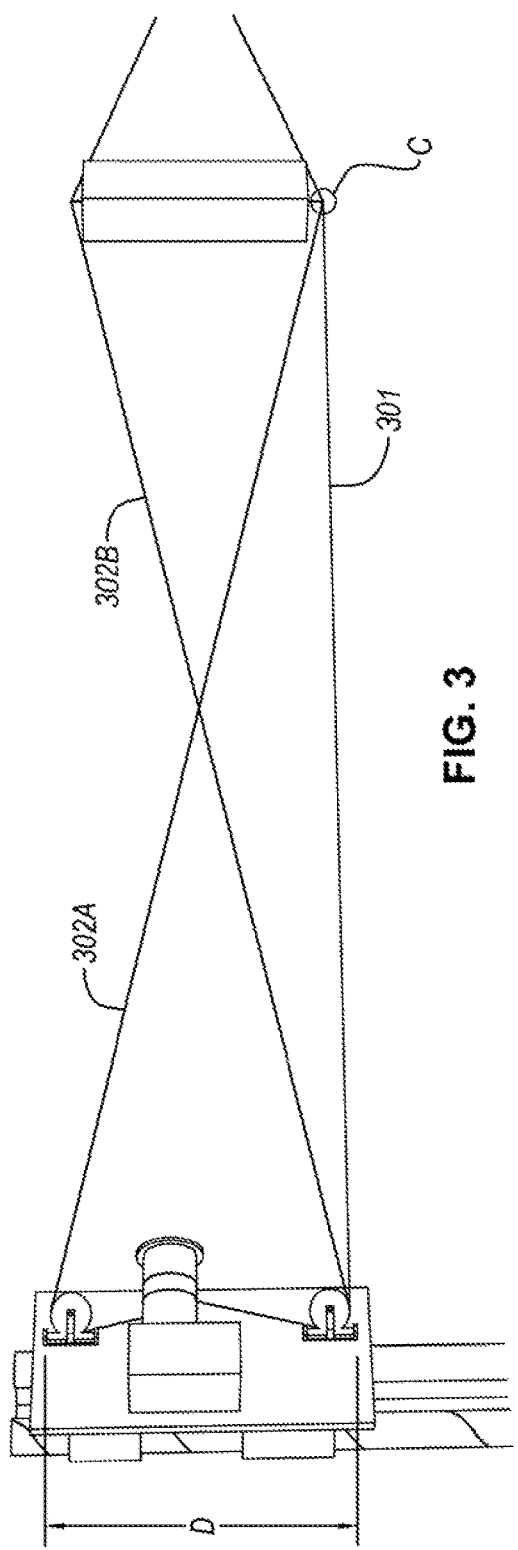
FIG. 3 illustrates an explanatory diagram of one method for determining the distance from a corner to a control point (the object being supported) according to an embodiment.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

FIG. 1A illustrates a schematic view of a cable-driven parallel robot (CDPR) with the cables in an X-configuration, according to an embodiment. FIG. 1B illustrates a schematic view of a CDPR, with the cables in a non-crossing configuration, according to an embodiment.

Referring to FIGS. 1A-1B, embodiments disclosed herein provide respective cable-driven parallel robots (CDPRs) 100A and 100B that include respective corner supports 102A-D and 112A-D, a rotor/motor device 110A-D and 120A-D on each respective supports 102A-D and 112A-D, respective objects (effectors) 104 and 114, such as a 3D print head, that is to be moved, and four pairs of cables 106A-D and 108A-D, and 116A-D and 118A-D wound on the respective rotor/motor devices 110A-D and 120A-D, where each pair of the cables 106A-D and 108A-D, and 116A-D and 118A-D connected between a respective one of the rotor/motor devices 110A-D and 120A-D and the effectors 104 and 114.

Referring to FIG. 1A, the cables 106A-D and 108A-D are in an X-configuration where one cable 106A-D of each pair of the cable 106A-D and 108A-D extends between the lower end of the rotor/motor device 110A-D and the upper end of the effector 104 and the other cable 108A-D extends between the upper end of the rotor/motor device 110A-D and the lower end of the effector 104.

Referring to FIG. 1B, the cables 116A-D and 118A-D are in a non-crossing configuration, where one cable 116A-D of each pair of the cables 116A-D and 118A-D extends between the lower end of the rotor/motor device 120A-D and the lower end of the effector 114 and the other cable 118A-D extends between the upper end of the rotor/motor device 120A-D and the upper end of the effector 114.

Motion of the cable robot 100A and 100B is limited to two dimensions (a single plane)-along the X and Y axis. Motion along the vertical Z axis (third dimension) is accomplished by raising and lowering the entire cable robot. Such a configuration simplifies the device and, importantly in a 3D printing context, cables will not cross the path of the printed material of a previous layer when the effector is moved to an extreme X or Y position. The cables 106A-D and 108A-D, and 116A-D and 118A-D are kept in tension by the respective motors 110A-D and 120A-D exerting opposing tension forces on the respective end effectors 104 and 114. The rotor/motors 110A-D and 120A-D move simultaneously to preserve the tension in the system. Tension sensors may be employed and placed on the cables 106A-D and 108A-D, and 116A-D and 118A-D to measure the tension in the cables 106A-D and 108A-D, and 116A-D and 118A-D and report to a software control system if the tension needs to be adjusted. In this way, excess sag in the cables 106A-D and 108A-D, and 116A-D and 118A-D may be corrected and changes in the length of the cables 106A-D and 108A-D, and 116A-D and 118A-D, such as from variations in temperature, may be compensated.

If desired, the rotor/motor devices 110A-D and 120A-D may be secured to a frame, instead of to the vertical supports 102A-D and 112A-D. The rotor/motor devices 110A-D and 120A-D are moved along the Z-axis by raising and lowering the frame.

It will be appreciated that, although the CDPRs 100A and 100B are described and illustrated with rotor/motor devices 110A-D and 120A-D, the CDPRs 100A and 100B may be constructed with a greater or lesser number of rotor/motor devices 110A-D and 120A-D, such as for example three for each of the CDPRs 100A and 100B. In an embodiment, the configurations of the cables 106A-D and 108A-D (e.g., in an X-configuration) and 116A-D and 118A-D (e.g., in a non-crossing configuration) may be combined and used in a CDPR.

FIG. 2A illustrates a view of an exemplary two-motor configuration of a CDPR according to an embodiment; FIG. 2B illustrates a view of an exemplary single-motor configuration of a CDPR according to an embodiment; and FIG. 2C illustrates a view of an exemplary variation of the single-motor configuration of a CDPR according to an embodiment.

Referring to FIGS. 2A-2C, FIGS. 2A, 2B, and 2C illustrate different rollers 210A, 220A, and 230A and motors 210B, 220B, and 230B (each roller/motor collectively 210, 220, and 230) configurations that may be incorporated into a CDPR.

Referring to FIG. 2A, the roller/motor device 210 provides a separate roller and motor for separate upper and lower cables 216A and 216B. In an embodiment, the cables 216A and 216B may be threaded through respective holes 219A and 219B. Referring to FIG. 2B, the roller/motor device 220 provides a common roller 220A and motor 220B and the upper and lower cables 226A and 226B formed as a single cable 226. The upper and lower cables 226A and 226B may be extended through holes 229A and 229B. Referring to FIG. 2C, the roller/motor device 230 also provides a common roller and motor and the upper and lower cables 236A and 236B are also formed as a single cable 236. Pulleys 238A and 238B may facilitate small changes in the direction of the cable 236 as the effector (e.g., effectors 104 and 114) is moved.

When the cables in the robot are independently controlled, each with their own motor as in cables 216A and 216B, instead of in pairs, as in cables 226 and 236, the attitude and pitch of the ends of the effector (e.g., effectors 104 and 114) may be adjusted. Such control may require more advanced kinematics than maintaining the effector in a static orientation.

The CDPRs according to embodiments provide numerous advantages over traditional Cartesian robot designs, including:

Size flexibility—The length of the cables can theoretically be unlimited for maximum range and workspace volume, enabling the CDPR to adapt to the size of each location where it is utilized. In contrast, Cartesian robots often are built with beams and components which cannot increase or decrease in length and are usually built in one particular size, which is not easily adapted later for a different size.

Light weight—The weight of the CDPR is considerably lighter than a Cartesian robot, which has an X and Y gantry system consisting of beams along which the effector travels. Because of the weight savings due to using cables instead of beams, the motors necessary to run the CDPR are smaller. This in turn means less weight is needed in the vertical support or frame structures as well as in the motor and rotor assemblies. Less weight also reduces the inertia that must be overcome when stopping or changing the direction of the effector.

Portability—The CDPR may be disassembled and re-assembled with less effort than a Cartesian robot. The cables may be spooled on the rotor and are much more compact than the beams necessary for the Cartesian robot.

Low cost—Due to the use of smaller motors, lighter components, fewer large components, and lower cost cable, significant cost savings can be achieved in the overall design.

No interference with the previously printed layers in the 3D printer application—It is very important that once a layer has been deposited, the cables do not intersect with the printed material when moving the effector to another position. CDPR of the present invention raises all the cables vertically as it rises and so keeps them out of the print area. In contrast, a traditional cable driven robot has cables anchored in the lower corners of the workspace. Thus, when the effector is moved to the extremes of the workspace, the lower cables form acute angles and can easily intersect with the printed model.

Ability to attach to existing structures—the vertical tracks for raising and lowering the CDPR can be attached to an existing structure, such as the walls of a garage. This allows for a reduction in the materials necessary to support the CDPR and can provide a more rigid structure around the workspace.

FIG. 3 illustrates an explanatory diagram of one method for determining the distance from a corner to a control point (the object being supported) according to an embodiment.

The kinematics of cable driven parallel robots can be very complex when calculating movement in terms of the workspace analysis and plotting trajectories with 6 degrees of freedom that must be performed by using only a pulling force through the cables and not a pushing force. Therefore, limiting the operation of the cable robot portion of the device to simple translation-only motion (with moment-resisting capability) and easy forward and inverse kinematics reduces complexity.

The horizontal movement can be simplified to that of a plotter having just two degrees of freedom. The simplified geometry can be more readily optimized.

The kinematics are further simplified by using a single control point for translations and three or more virtual cables. Referring to FIG. 3, one virtual cable 301 may be used for each pair of real cables 302A and 302B. And the control point C becomes the point where the virtual cables connect at the end effector. Because the distance D between the upper and lower cables (e.g., cables 302A and 302B) on a given rotor and motor device is known and constant, that distance D can become the vertical leg of a right triangle. The actual cable distance from the pulley or hole to the end effector is the hypotenuse, and the horizontal distance from the rotor and motor device and the end effector becomes the base of the right triangle; this is the virtual cable 301. Then, simple two-dimensional kinematics are used to calculate the related distances and vectors for locating the end effector. The actual cable distance (the hypotenuse of the triangle) may be calculated trigonometrically and the same value can be used for both cables in the pair.

Further simplification of the CDPR is also possible by providing full horizontal control using only two motors. At least three pairs of cables are still required. However, the non-motorized cables can be passive. However, instead of being connected to a motor and rotor, the cables can be connected to a suspended weight or tension device, such as a spring. After the cable passes through the pulley or hole, it continues downward until it connects with the weight. The weight is suspended from the cable and exerts a downward force on the cable, creating a constant tension in the cable that is proportional to the suspended weight. When the CDPR employs four pairs of cables, as two active pairs of cables move the end effector, the two passive pairs create the necessary tension in all cables.

Figure 4:
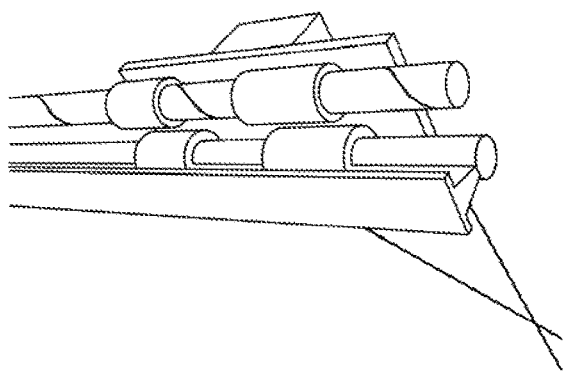
FIG. 4 illustrates a view of components for moving a CDPR in a vertical direction according to an embodiment.

FIG. 4 illustrates a view of components for moving a CDPR in a vertical direction according to an embodiment.

The entire cable robot structure (e.g., CDPR 100A and 100B) may be raised and lowered as all of the roller/motor devices (e.g., devices 110A-D and 120A-D) are raised and lowered together as a unit. As noted above, each roller/motor device may be attached to a vertical track or rail (e.g., rails 102A-D and 112A-D). For example, the roller/motor device could be attached to a linear guide rail and slide along the rail with linear bearings. The entire structure may be raised or lowered vertically by either being pulled by another roller/motor device or by a threaded rod, which turns and advances one or more nuts attached to the assembly, as illustrated in FIG. 4.

Figure 5A:
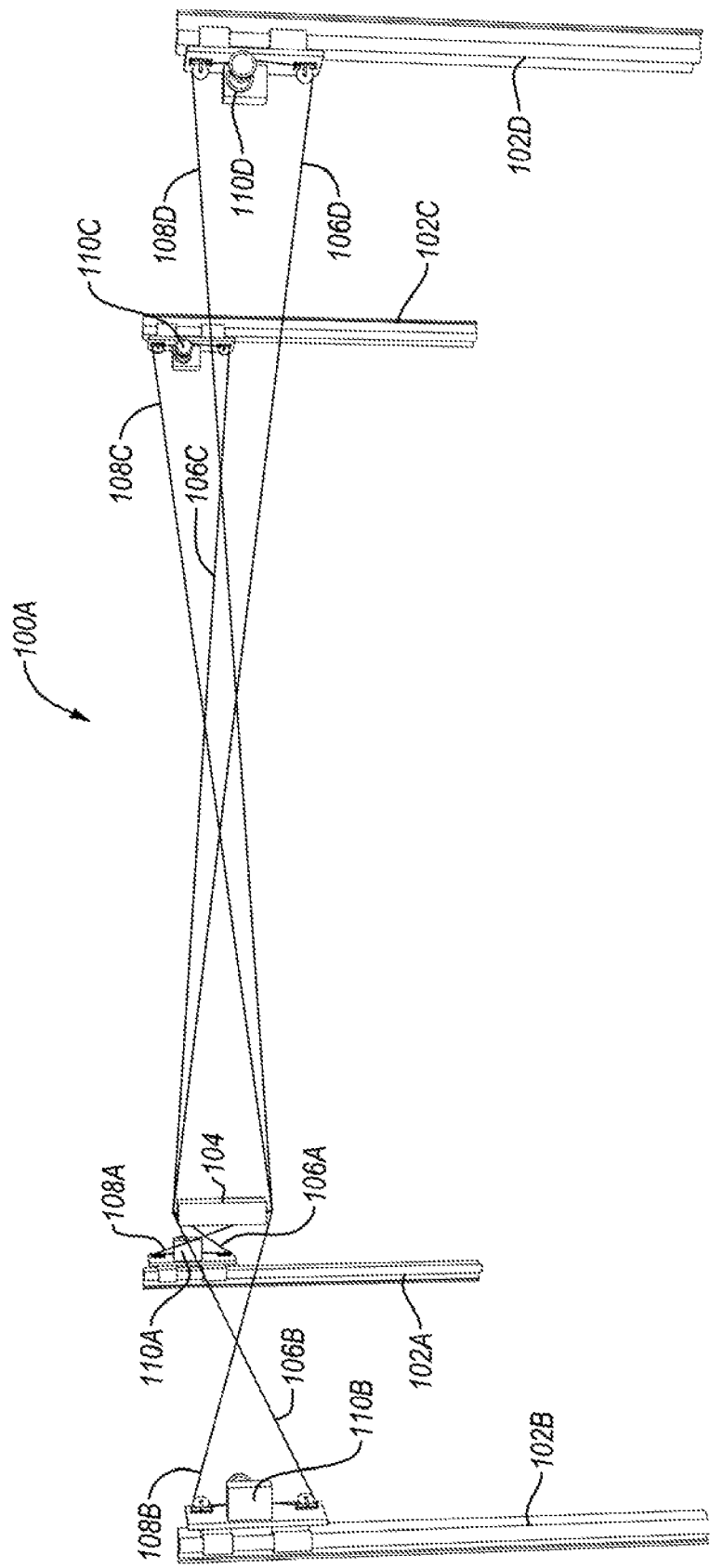
FIG. 5A illustrates a perspective view of a CDPR of FIG. 1 with all four rotor/motor devices near the top of their respective vertical tracks according to an embodiment.
Figure 5B:
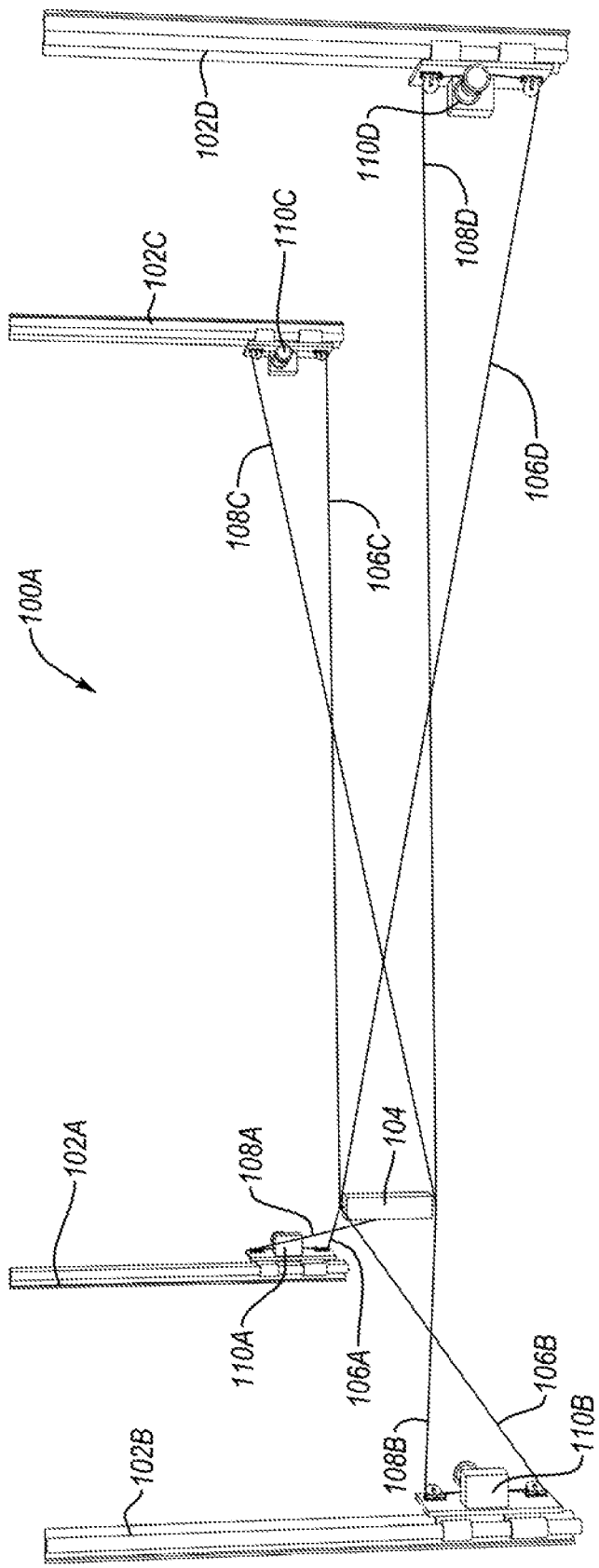
FIG. 5B illustrates a perspective view of a CDPR of FIG. 1 with all four rotor/motor devices near the bottom of their respective vertical tracks according to an embodiment.
Figure 5C:
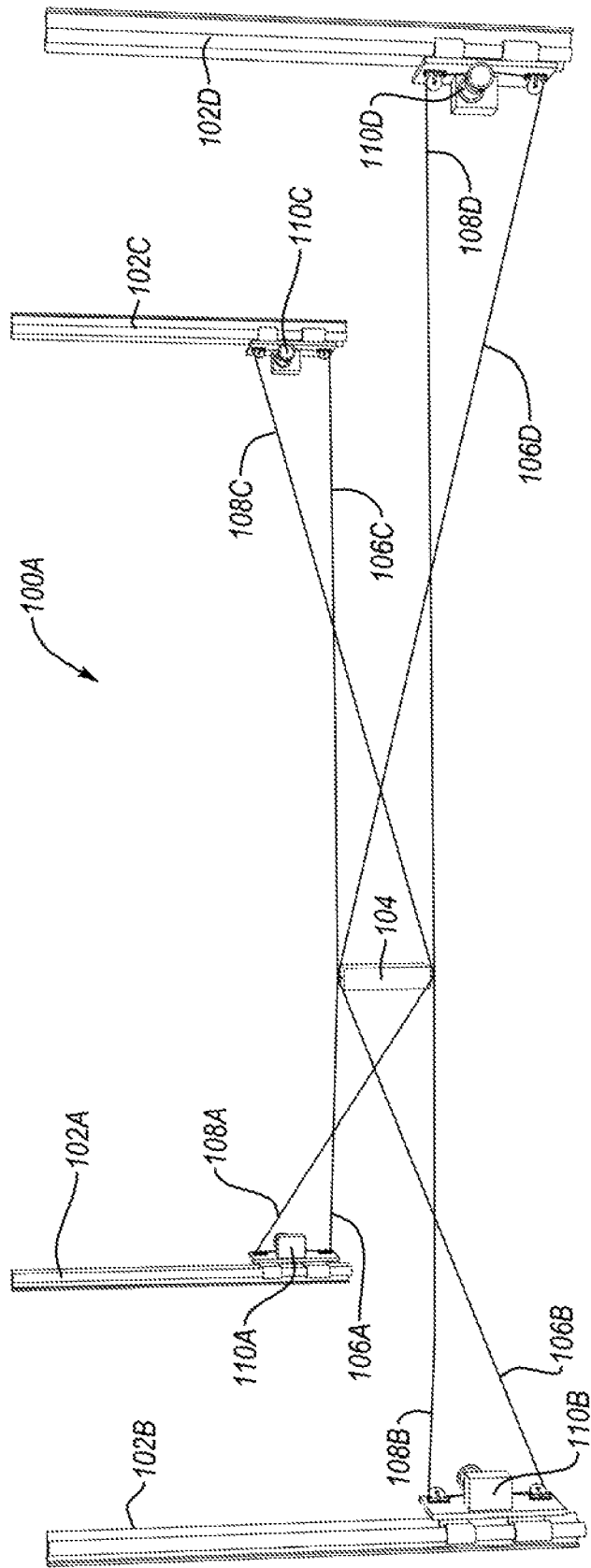
FIG. 5C illustrates a perspective view of a CDPR of FIG. 1 with the effector having been moved towards the center of the frame according to an embodiment.

FIG. 5A illustrates a perspective view of a CDPR of FIG. 1 with all four rotor/motor devices near the top of their respective vertical tracks according to an embodiment; FIG. 5B illustrates a perspective view of a CDPR of FIG. 1 with all four rotor/motor devices near the bottom of their respective vertical tracks according to an embodiment; and FIG. 5C illustrates a perspective view of a CDPR of FIG. 1 with the effector having been moved towards the center of the frame according to an embodiment.

FIGS. 5A and 5B illustrate the CDPR 100A in the fully raised and fully lowered positions, respectively, with the effector 104 in a first position. FIG. 5C illustrates the effector 104 having been translated from the first position toward to a second position the center of the CDPR 100A.

FIG. 6A illustrates a close-up perspective view of a laser positioning device mounted to a rotor/motor device according to an embodiment; and FIG. 6B illustrates a broader perspective view a CDPR with the laser positioning device of FIG. 6A.

Referring to FIGS. 6A and 6B, further location detection and subsequent positioning of the effector (e.g., effectors 104 and 114) may be accomplished by securing a laser measurement device 620 at each attachment point of a CDPR (e.g., CDPRs 100A and 100B) and aligning the laser with the cable 606 that leads to the effector, such as a print head. In one embodiment, the laser measurement device 620 may be the same type of device that can be found in hand-held laser distance measuring devices.

The laser 620 may be attached to a sleeve 622 through which the cable 606 (which may be coiled by pulley/motor 610) runs. The laser 620 may then be aimed at a target 624 which is fixed at the print head 604. Retroreflective target reflectors attached to the print head 604 ensure the laser beam is returned to the laser device 620 with high signal strength to indicate that the laser is targeting the reflector. The cable 606 changes angle vertically as the print head 604 nears, and the laser device 620 will be passively, automatically, and/or continually be adjusted towards the spot 624. One location for the target may be near the end of the cable 606 where a washer-type plate 624 is attached around the cable. In an embodiment, the plate 624 will always be perpendicular to the direction of the cable and hence the direction of the laser.

FIG. 7 illustrates a perspective view of a CDPR employing two laser positioning devices according to an embodiment.

Referring to FIG. 7, the two lasers 720A and 720B are trained and adjusted towards spot 724 of the effector 704.

FIG. 8 illustrates a perspective view of a CDPR employing four laser positioning devices according to an embodiment.

Referring to FIG. 8, the four lasers 820A-D are trained and adjusted toward spot 824 of the effector 804.

Figure 9A:
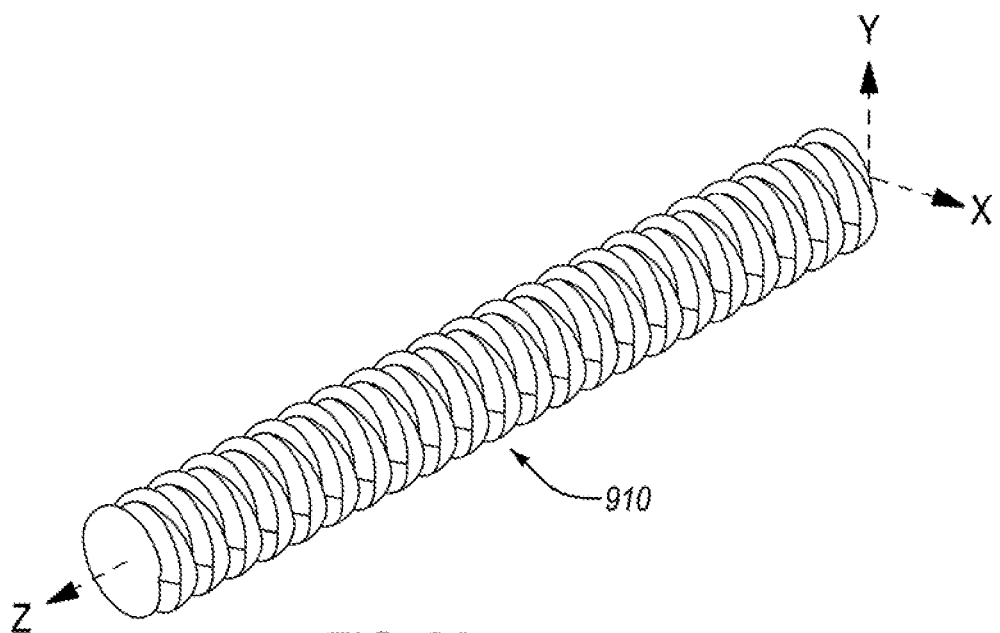
FIG. 9A illustrates a perspective view of a winch drum for a CDPR according to an embodiment.
Figure 9B:
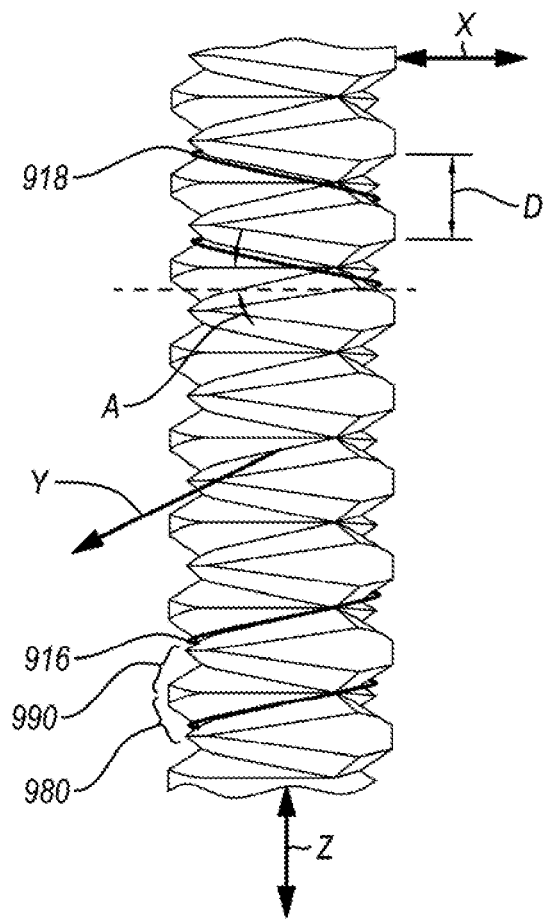
FIG. 9B illustrates a front view of the winch drum of FIG. 9A.

FIG. 9A illustrates a perspective view of a winch drum for a CDPR according to an embodiment; and FIG. 9B illustrates a front view of the winch drum of FIG. 9A.

Referring to FIGS. 9A and 9B, a winch drum 910 includes helix spiral v-channel grooves 980 and 990 along the length (aligned with the Z-axis) of the winch drum 910. In an embodiment, each set of the grooves 980 and 990 may cross the other set, allowing each set of the grooves 980 and 990 to accommodate a respective cable 916 (for the grooves 980) and 918 (for the grooves 990).

In an embodiment, each groove of the circular v-channel grooves 980 and 990 may be at an angle A (e.g., 0-30 degrees) with the X-axis. Each groove may be at a similar distance D with each other along the length of the winch drum 910. The distance D may depend on the diameter of the winch drum 910 and the angle A (e.g., diameter of the winch drum*tan A).

In an embodiment, the winch drum 910 may turn in one direction (e.g., clockwise) to wind up (and collect) the cables 916 and 918 into the respective grooves 980 and 990 and may turn in the opposite direction (e.g., counter-clockwise) to release the cables 916 and 918 from the respective grooves 980 and 990.

Because the cables 916 and 918 are moved in equal amounts as the winch drum 910 rotates, the vertical alignment of an effector attached to the cables 916 and 918 is effectively locked. Because the opposing helix spiral v-channel groves guides both of the cables 916 and 918, the winch drum 910 may be driven by one motor.

In an embodiment, a winch drum 910 may be 3D printed with carbon fiber reinforced ABS. A 3 mm Dyneema cable with a rated breaking strength of 2,094 lbs, which may be twisted around a small diameter winch drum without kinking, may be used for the cables 916 and 918. Light weight and high tensile strength may be important for eliminating sag. Further, safety may be provided in that when reaching breaking strength, the cable may break in such a way as to disperse the energy along its length instead of potentially wild and dangerous whipping.

In an embodiment, depending on the size of the print area and the quantity and diameter of cable used, sizes for the winch drum may vary from 5 mm in diameter for very small cable robots to up to 1 meter or larger in diameter for very large print areas utilizing large cables. The pitch angle on the flights or windings of the helical winch drum may typically vary anywhere from 4 degree to 60 degrees depending on the desired angle and resulting tension factor. To maintain the cables in their paths along the winch drum, a raised area forms a V groove where the cable is directed during winding. The distance between each winding gets smaller as the cable angle becomes less. Angles less than 4 degrees leave no space between windings for the raised sides of the V groove.

In an embodiment, the length of the winch drum can also vary from under 1 cm for very small applications to up to 30 feet or larger. Long winch drums are required if cable angle is to be preserved over large print areas. For example, a print area of 20 feet wide×20 feet long which has a cable angle of 15 degrees has need a helical winch drum of approximately six feet in length FIG. 10A illustrates a perspective view of a CDPR using winch drums in a high vertical position according to an embodiment; and FIG. 10B illustrates a perspective view of a CDPR using winch drums in a low vertical position according to an embodiment.

Figure 10A:
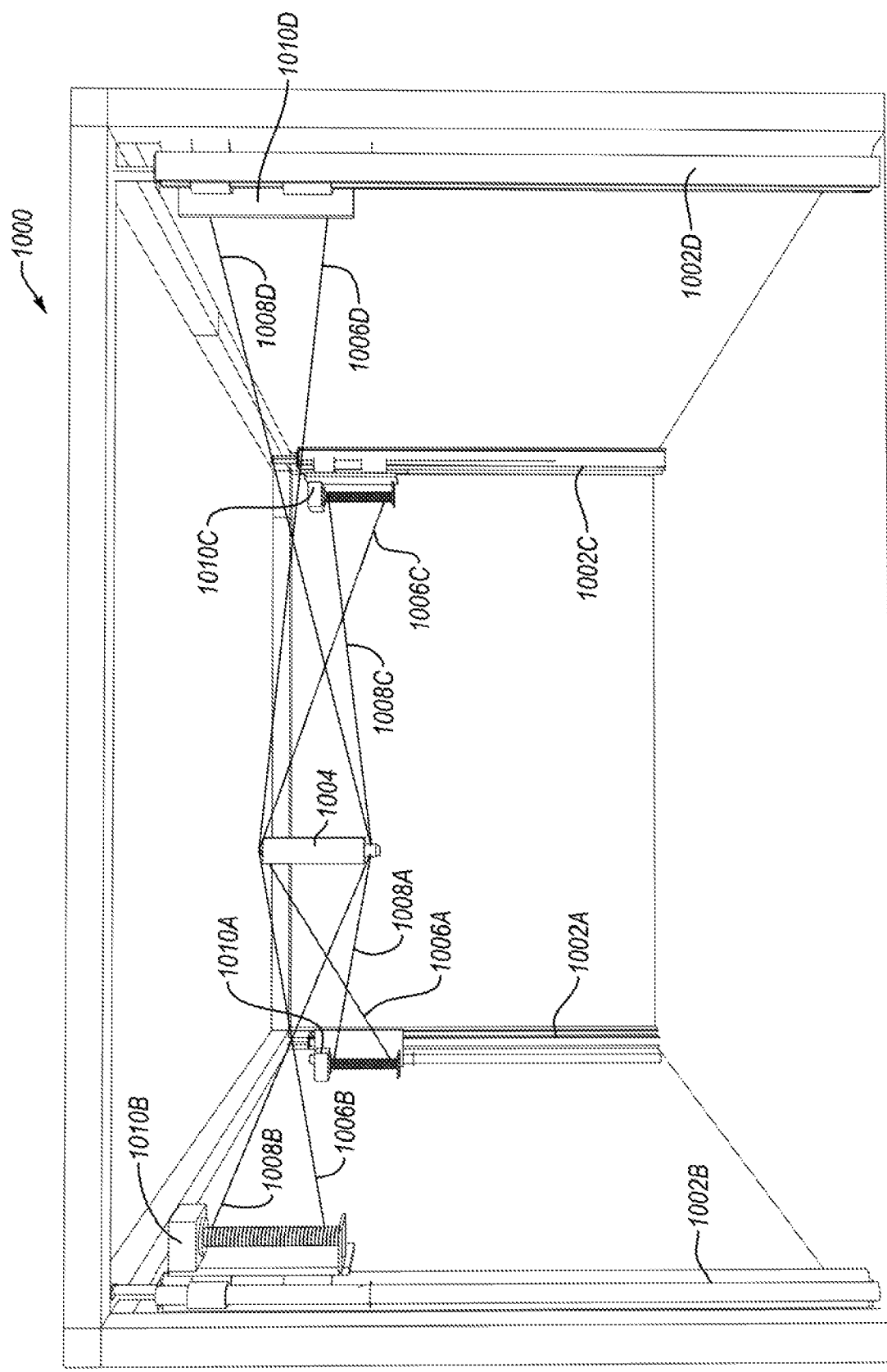
FIG. 10A illustrates a perspective view of a CDPR using winch drums in a high vertical position according to an embodiment.
Figure 10B:
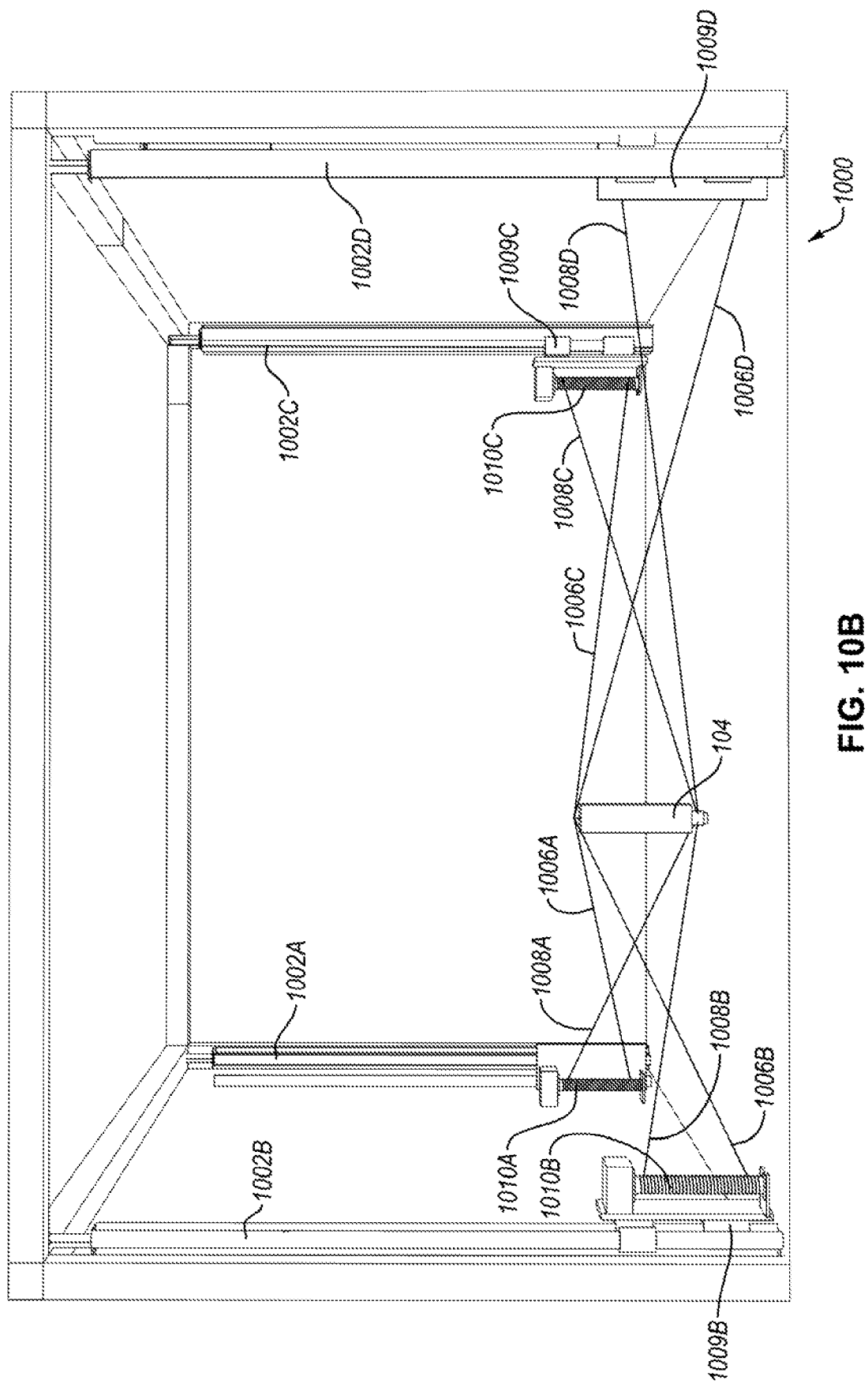
FIG. 10B illustrates a perspective view of a CDPR using winch drums in a low vertical position according to an embodiment.

Referring to FIGS. 10A and 10B, the CDPR 1000 includes supports 1002A-D, winch drums 1010A-1010D, high and low cables 1008A-D and 1006A-D, and effector 1004. In an embodiment, the winch drums 1010A-1010D may be raised and lowered on a respective support 1002A-D (and the winch drums 1010A-1010D may be raised and lowered together as a unit in typical usage) using the vertical tracks and/or rails similar to as illustrated in FIG. 4. In an embodiment, the winch drums 1010A-1010D may collect and release the respective cables 1006A-D and 1008A-D similar to as disclosed with respect to winch drum 910.

Figure 11:
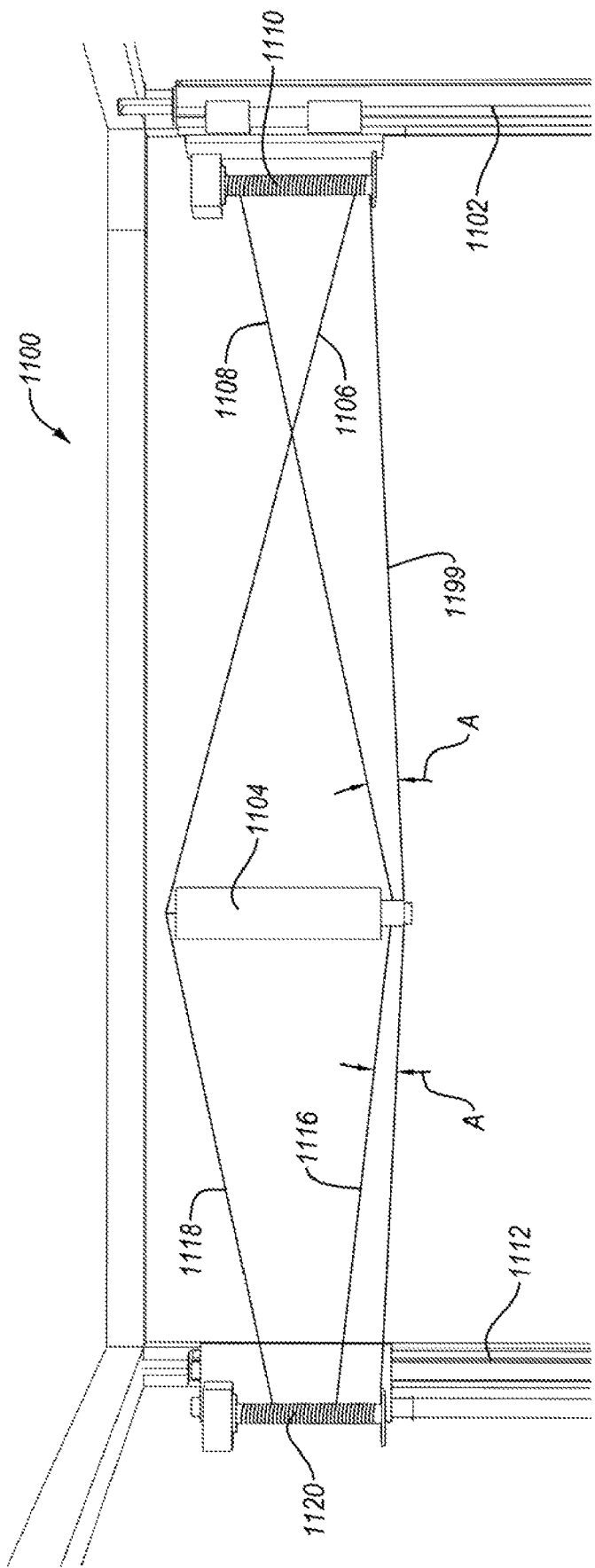
FIG. 11 illustrates a front view of a portion of a CDPR using winch drums according to an embodiment.

FIG. 11 illustrates a front view of a portion of a CDPR using winch drums according to an embodiment.

In an embodiment, a CDPR may include at least one winch drum 1110 holding cables 1106 and 1108 arranged in an X configuration (e.g., the lower cable 1106 on the winch drum 1110 is connected to a high end of the effector 1104 (as a stabilization cable) and the upper cable 1108 on the winch drum 1110 is connected to a low end of the effector 1104 (as a weight bearing cable), the cables 1106 and 1108 cross at some point between the winch drum 1110 and the effector 1104), similar to the arrangement in the CDPR 100A. The CDPR may include at least another one winch drum holding cables 1116 and 1118 arranged in a non-intersecting configuration (e.g., the lower cable 1116 on the winch drum 1120 is connected to a low end of the effector 1104 (as a stabilization cable) and the upper cable 1118 on the winch drum 1120 is connected to a high end of the effector 1104 (as a weight bearing cable), the cables 1116 and 1118 do not cross between the winch drum 1120 and the effector 1104).

In an embodiment, the angle A that the cables (e.g., lower cables 1106 and 1116) make with a horizontal plane (e.g., horizontal plane 1199 that intersects the low end of the effector 1104) is consistent as the effector 1104 moves at various positions on the horizontal plane. In an embodiment, the angle A is consistent with the angle of the grooves of the winch drum 1110 (e.g., angle A as described with respect to winch drum 910. A feature of the constant cable angle A is that the winch drums 1110 and 1120 of a CDPR may share an equal distribution of the load at any position. When the winch drums 1110 and 1120 (and the motors driving the winch drums 1110) share the load equally, greater loads on the effector 1104 is possible. This feature has not been seen in cable robotics.

Figure 12:
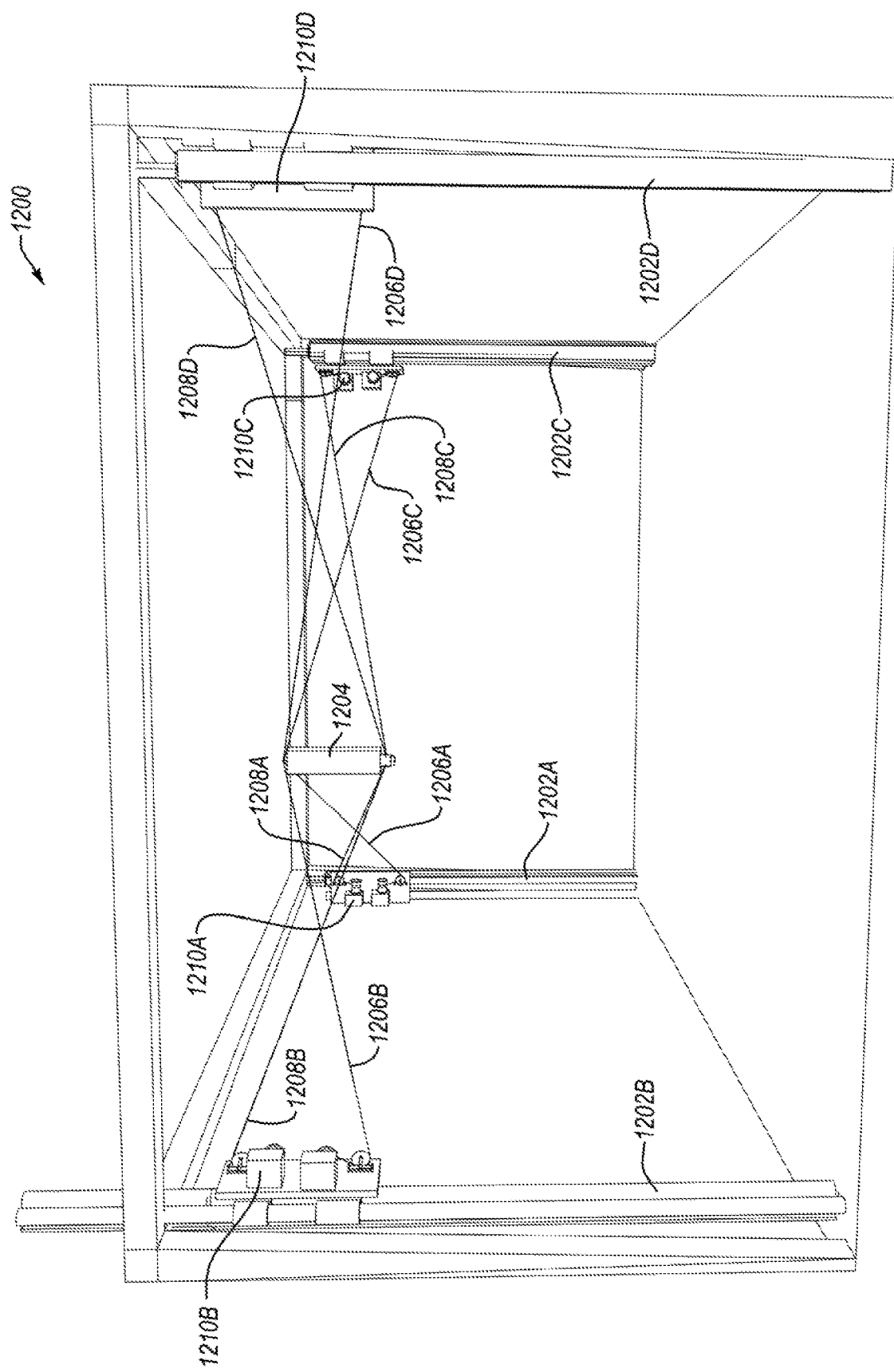
FIG. 12 illustrates a perspective view of a CDPR using dual motors according to an embodiment.

FIG. 12 illustrates a perspective view of a CDPR using dual motors according to an embodiment.

Referring to FIG. 12, the CDPR 1200 includes supports 1202A-D, upper motors 1010A-1010D, lower motors 1011A-1011D, high cables 1008A-D, low cables 1006A-D, and effector 1004. In an embodiment, the upper motors 1010A-1010D and lower motors 1011A-1011D may be raised and lowered on a respective support 1002A-D (and the upper motors 1010A-1010D and lower motors 1011A-1011D may be raised and lowered together as a unit in typical usage) using the vertical tracks and/or rails similar to as illustrated in FIG. 4. In an embodiment, the upper motors 1010A-1010D may collect and release the respective upper cables 1006A-D, and the lower motors 1011A-1011D may collect and release the respective lower cables 1008A-D similar to as disclosed with respect to roller/motor device 210).

In an embodiment, the dual motors configuration may be adapted for a double winch system. The double winch system may utilize two winch drums connected to a single drive train which may coil and uncoil two cables in a synchronized fashion (e.g., two winch drums stacked as an upper drum and a lower drum to a gearbox and motor in a vertical post assembly). In an embodiment, the winch system may include an integrated force sensor and a redundant brake. The double winch system may provide further reliable coiling and uncoiling of the cable, which may be important for certain applications where the velocities and/or accelerations of the cables may be very high. The winches may readily change direction of spin. In an embodiment the winch lengths may be changed by an actuation system. The winch may also have an omnidirectional guidance pulley (for operations where the cables continuously change).

In an embodiment, the CDPR system may be fitted with a counterweight system for the winches on any number of the winch assemblies, where the winch drum extends to include an additional drum with a separate winding of cable which is attached to a suspended weight. This winding is in the opposing direction so that when cable is released from the robot side, the counter weight side is wound and vice versa.

The suspended weight pulls the cable giving a constant load on the winch drum in the opposite direction as the load coming from the cable attached to the manipulator. This may serve to keep the cables of the robot in tension as long as the opposing tension provided by the counter weight is greater than the tension required to keep the cable robot in position. In an embodiment, the counterweight system may be used with the helical winch drum assembly, or the assembly with a conventional winch which feeds the cables through pulleys at the top and bottom of the assembly.

In an embodiment with 2 motors on two adjacent sides the CDPR allows for the other two winch assemblies to utilize only the counterweight system and no motors. The two remaining motors continue to adjust the length of their cables to move the robot. The counterweights in turn take any slack created in the system due to their constant counteracting load. This embodiment has the advantage over conventional cable robots of requiring only two motors for horizontal motion instead of four or eight, which greatly reduces the cost of the machine.

Depending on the angle of the cables and the position of the manipulator in the print area, the counterweight may vary from 75% of the weight on the manipulator to up to three times the weight of the load on the manipulator. The mechanical advantage of the counterweight system can be adjusted by changing the diameter of the drum which winds the counterweight cables, or the number of pulleys used to move the weight. However, the remaining motors on a system with the counterweight system may need to use additional power to move both the weight of the manipulator and the weight of the counterweight when traveling against the pull of the counterweight. An additional embodiment utilizing the counterweight system is to employ counter weights on all winch assemblies as a means to assist the motors and provide a continuous tension on all cables.

In an embodiment, the structure for the CDPR may be deployed from a flat pack system, which may be erected by a workman quickly. For example, the main setup components may be four vertical posts with swing-out supports, which are easy to transport, install, anchor, and dismantle. Each post may house a vertical track on which the winch and/or rotor/motor may travel up and down. The four winches may control the horizontal motion of the print head via eight cables.

In an embodiment, the CDPR system may be enclosed by affixing cross-members and panels or tarps to the frame, which allow for printing and other usage in a variety of conditions.

In an embodiment, the CDPR design eliminates a need for a large gantry assembly and the rails and beams needed to support it.

In an embodiment, the CDPR may be used in spanning gaps and/or bridge creation. For example, an extended nozzle to the print head may allow printing below grade, which would allow for the printing of bridges in place.

In an embodiment, a material feed system may be used in the CDPR (e.g., attached to the print head) for certain applications (e.g., concrete applications). In an embodiment, material feed system may include hose support for supporting the weight of the material feed hose so that minimal extra weight is placed on the printhead. For example, a radial arm from the center of the print area may be suspended above the CDPR to support the weight of the hose so that only a small portion of the hose is weighted on the printhead.

In an embodiment, the CDPR may include an extending and retracting suspension bridge which connects directly to the print head. Cables may extend from the winch drum to support a rigid jointed hose sleeve along its length. The hose support driver wheel advances and retracts hose while swiveling to allow freedom of hose direction. Further a radial arm (which may be adapted from conventional concrete placer booms may extend from the center of the print area and has a single joint which allows it to reach any point in the print area. It may be supported by a circular track which rises together with the winch assemblies.

In an embodiment, a method for calibrating a CDPR is disclosed. Because the distance from each post is always known, a perfectly square area is not needed for calibrating the printer to find the position of the posts (e.g., posts 102A-D and 112A-D) or the shape of the print area having a perimeter defined by the posts. Calculating the position of each post can be performed by moving the print head (e.g., effector 104 and 114) towards one post until it is a short distance from the post. Measurements can be taken from that position to the close post and to the other posts. Then, the print head can travel close to each other post and repeat the measurements. After storing the data of distance to each post in the controller, the position of each post can be triangulated by the controller based on the reading from at least two other posts.

This method does not require that the print head to travel the entire distance towards each post to take a measurement, although the closer the print head is to a post, the greater will be the accuracy of the calculated positions.

Once the positions of all posts are known, the shape defined by the posts can be calculated. From that data, a more accurate model of the movement of the print head and the control needed for the motors can be generated and implemented.

It is also possible to achieve greater accuracy in detecting changes in the height of the print head. One method for detecting a situation in which the print head is below an acceptable height is for lasers to be securely applied to both the top and the bottom cables (e.g., cables 108A-D and the respective cables 106A-D). This especially applies to the version of a printer in which the cables are in the X-configuration (e.g., CDPR 100A). The measurements of the top and bottom cables will be in conflict with each other since the bottom cable which extends to the top of the print head will be shorter than the top cable which extends to the bottom of the print head.

When a sag in the print head is detected, the roller/motors (e.g., rollers 110A-D) may be adjusted to increase cable tension, or the height of the CDPR may be adjusted at the posts. For an initial calibration, the print head may be moved a short distance towards two posts. The two roller/motors on the side of the CDPR in the direction of travel will take in equal amounts of cable and the two roller/motors on the opposite side, away from the direction of travel, will release cable as required. Then, tension may be adjusted and measurements taken at the new position of the print head. The new position can be compared with the old position to create a line from which the measurements to all posts correlate.

The laser system is also able to detect a low tension in the cable because when the tension in the cable is too low, the cable will no longer be straight enough to point the laser (e.g., laser 620) to the print head target (e.g., target 624). The distance measurement will increase as a distance further than the target is detected. An algorithm may be introduced into the measurement routine in order to detect such a condition. Tension may then be increased to determine whether the distance is again within expected parameters.

Once the printer (or other device to which the CDPR is incorporated) is calibrated and the shape of the print area calculated and verified, the laser distance measuring devices may be used to track the print head (or other effector) and determine its position with high accuracy. Each laser device may dynamically transmit the data of the measured position to the controller and that data can be correlated against the data from the other laser devices in the CDPR. A composite position measurement may then be created to more accurately calculate the position of the print head. With the position of the print head known, that position may be compared by the controller with the intended position and any adjustments may be made. This serves as both a verification of the print's accuracy and as real time feedback for the printer to self-correct if conditions cause the print head to be out of position.

The features of verification and self-correction are highly sought after in the 3D printing community. It is common for a print which takes many hours or even days to be ruined when, at some point in the process, the printer became misaligned and out of tolerance. In large format 3D printing, the risks are magnified to the point of being prohibitive. The waste of time and material could be averted if an active monitoring system was in place, as is performed by the CDPR of embodiments. Moreover, 3D printers may be assembled that are significantly larger than current conventional 3D printers with their size restrictions (e.g., 4-foot by 4-foot size restrictions). Similar concepts may also be applied in other contexts, such as construction where a CDPR of embodiments may replace a construction crane to lift and move loads around a construction site.

Figure 13A:
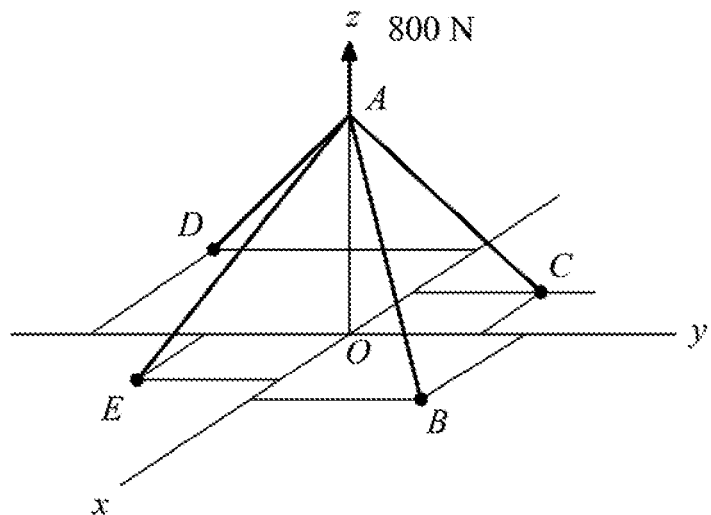
FIG. 13A illustrates a diagram showing the cable tension load of a four cables system according to an embodiment.
Figure 13B:
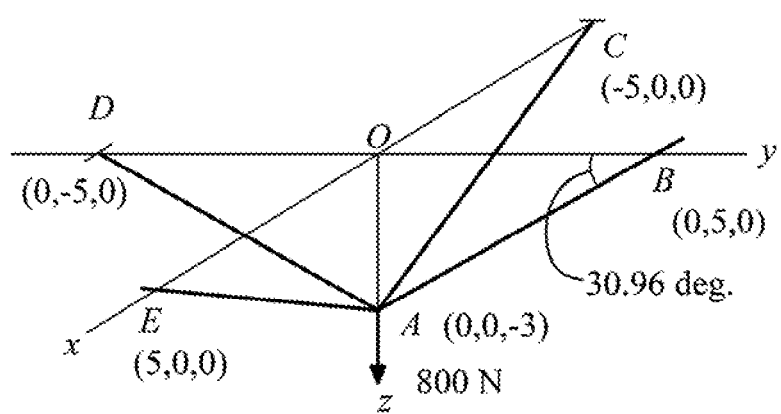
FIG. 13B illustrates an alternate diagram showing the cable tension load of a four cables system according to an embodiment.
Figure 13C:
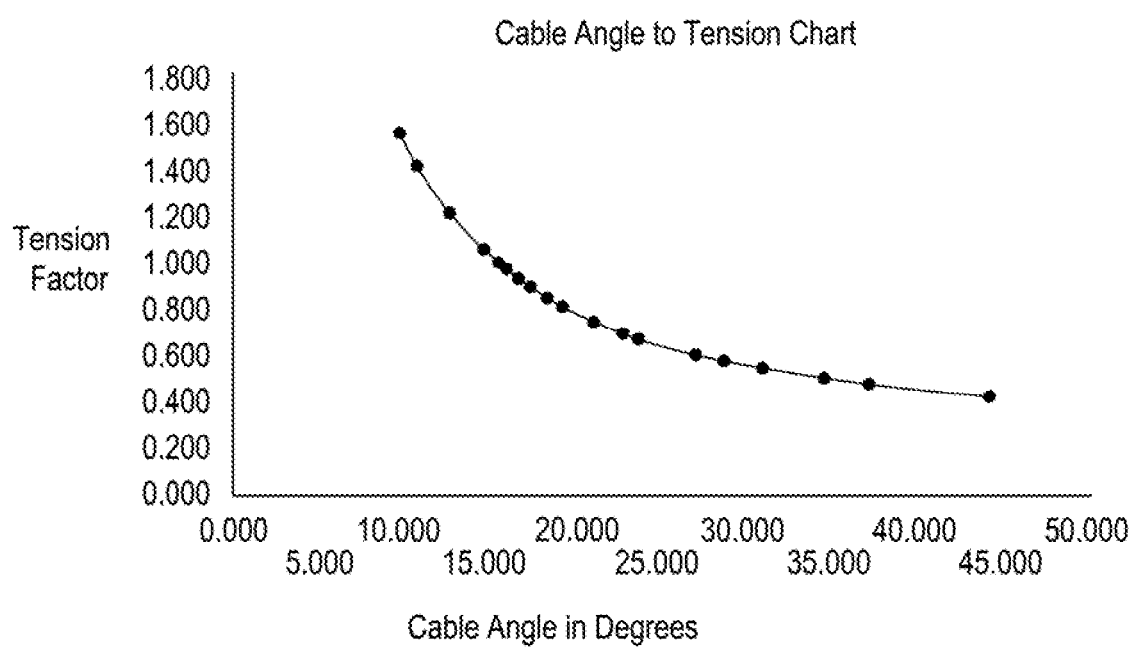
FIG. 13C illustrates a chart showing cable angle to cable tension according to an embodiment.

FIG. 13A illustrates a diagram showing the cable tension load of a four cables system according to an embodiment; FIG. 13B illustrates an alternate diagram showing the cable tension load of a four-cable system according to an embodiment; and FIG. 13C illustrates a chart showing cable angle to cable tension according to an embodiment.

Referring to FIG. 13A, take for example where an upward pulling force (along the z-axis) of 800 N is applied at point A. There are four cables attached to this load at point A. The cables can be described as AB, AC, AD and AE.

For this example, the positions in the x and y-axis for each point is listed in Table 1:

TABLE 1

|   | x | y | z |
|---|---|---|---|
| A | 0 | 0 | 5 |
| B | 4 | 4 | 0 |
| C | 3 | -2 | 0 |
| D | -5 | -4 | 0 |
| E | -4 | 6 | 0 |

To calculate the tension on me tour weight bearing cables, the following may be performed. First, calculate the unit vectors for each line of force, including the load at point A. A method of calculating unit vectors may be given by the Equation 1.

$$\hat{V} = \frac{x_1 - x_0}{\sqrt{(x_1 - x_0)^2 + (y_1 - y_0)^2 + (z_1 - z_0)^2}} \hat{i} +$$
$$\frac{y_1 - y_0}{\sqrt{(x_1 - x_0)^2 + (y_1 - y_0)^2 + (z_1 - z_0)^2}} \hat{j} +$$
$$\frac{z_1 - z_0}{\sqrt{(x_1 - x_0)^2 + (y_1 - y_0)^2 + (z_1 - z_0)^2}} \hat{k}$$

Equation 1

The results of the unit vectors for Example is given in Equations 2.

$U_{AB}$=0.530$i$+0.530$j$+−0.662$k$ $U_{AC}$=0.487$i$+−0.324$j$+−0.811$k$ $U_{AD}$=−0.615$i$+−0.492$j$+−0.615$k$ $U_{AE}$=0.456$i$+0.684$j$+−0.570$k$  Equations 2

Next, the resulting Unit Vectors may be multiplied by their tension forces to obtain the Cartesian vectors, as given in Equations 3. The tension force in each cable may be designated as a T in front of the cable name. For example, the tension in AB is designated $T_{AB}$. The load force is also included with 800 Newtons in the k direction as F and $U_F$.

$T_{AB} * U_{AB} = 0.530 T_{AB}i + 0.530 T_{AB}j + -0.662 T_{AB}k$   Equation 3

$T_{AC} * U_{AC} = 0.487 T_{AC}i + -0.324 T_{AC}j + -0.811 T_{AC}k$ $T_{AD} * U_{AD} = -0.615 T_{AD}i + -0.492 T_{AD}j + -0.615 T_{AD}k$ $T_{AE} * U_{AE} = -0.456 T_{AE}i + 0.684 T_{AE}j + -0.570 T_{AE}k$ $F * U_F = 0.000i + 0.000j + 800k$ $0i + 0j + 0k$

Because the system is in equilibrium, when all the cartesian coordinates are added together the result is zero. Three equations can be formed from the table of equations above, as Equations 4

$i \rightarrow 0.530T_{AB}+0.487T_{AC}-0.615T_{AD}-0.456T_{AB}=0$ $j \rightarrow 0.530T_{AB}-0.324T_{AC}-0.492T_{AD}+0.684T_{AB}=0$ $k \rightarrow -0.662T_{AB}+0.811T_{AC}-0.615T_{AD}-0.570T_{AB}=-800$   Equations 4

This system of three variables and three equations can be solved algebraically or by applying matrices. Once that is applied, we find that each cable has a tension in the opposing direction to the load force, as Equations 5.

$T_{AB}$=−354.073 Newtons $T_{AC}$=−265.683 Newtons $T_{AD}$=−304.807 Newtons $T_{AB}$=−283.860 Newtons   Equations 5

It can be shown in this model that the length of cable does not change the tension on that cable as long as the angle stays the same in relationship to the other cables in the system. For example, the cable AE will be lengthened by double its length, but will maintain the same unit vector as shown in the following example. The locations of the points are given in Table 2.

TABLE 2

|   | x | y | z |
|---|---|---|---|
| A | 0 | 0 | 5 |
| B | 4 | 4 | 0 |
| C | 3 | -2 | 0 |
| D | -5 | -4 | 0 |
| E | -8 | 12 | -5 |

Even though the cable length of AE has changed, output of the calculation of tensions is the same (as Equations 5). Similarly, it can be shown that cable angle in relationship to the load is the primary driver in determining the tension on each cable. The angle of the cable in relationship to the vector of the load can be described as the angle between the AE and a line perpendicular to AO, angle AEO, where AO represents vector of the force of the load and the location of points A, E and O are known.

The model for a CDPR design utilizes four cables that are kept at the same angle in relationship to the vector of the load (e.g., by using a winch drum 910). To simulate this, we can set up the four points around the load to form a square on the x and y plane as shown in FIG. 13B.

The locations of the winch drum points in the initial position are as shown in Table 3.

TABLE 3

|   | x | y | z | Cable Length | Cable Angle |
|---|---|---|---|---|---|
| A | 0 | 0 | -3 |   |   |
| B | 0 | 5 | 0 | 5.831 | 30.964 |
| C | -5 | 0 | 0 | 5.831 | 30.964 |
| D | 0 | -5 | 0 | 5.831 | 30.964 |
| E | 5 | 0 | 0 | 5.831 | 30.964 |

By varying the location of A within a horizontal plane at z=−3, we can model the CDPR load at different locations within the print area. The z value will be kept the same for all point A locations. The z values for the winch points, (B, C, D and E) will be varied to preserve the cable angle in relationship to AO. Table 4 shows positions at a second load location.

TABLE 4

|   | x  | y  | z       | Cable Length | Cable Angle |
|---|----|----|---------|--------------|-------------|
| A | 1  | 2  | −3      |              |             |
| B | 0  | 5  | −1.1026 | 3.688        | 30.964      |
| C | −5 | 0  | 0.7947  | 7.376        | 30.963      |
| D | 0  | −5 | 1.2426  | 8.246        | 30.963      |
| E | 5  | 0  | −0.3167 | 5.215        | 30.964      |

Plotting all output tensions for possible cable angles (e.g., angle A in FIG. 9B) results in a curve where x is the cable angle and y is the cable tension factor for the winch with the greatest tension at that point, as shown in FIG. 13C.

Based on the sample data, a simplified algorithm was developed for CDPR using a linear function to match the curve of the results for useful cable angles according to an embodiment. In this way, the system of equations and inputs is simplified and the new function requires only the cable angle input variable. In Equation 6, y is the Cable Tension factor and x is the Cable angle. LN is the natural log function.

$$y = -1*LN((x-8.6))/2.5 + 1.803 \qquad \text{Equation 6}$$

In an embodiment, cable pairs may be viewed as a belt that allows for the adaptation of existing motion control software to be applied to this device. The motion of the Cartesian X and Y motion control can be substituted with a polar expression and calculated for each winch. Since the calculations are fundamentally 2D instead of 3D, less intensive calculations are required in the motion control system.

Figure 14:
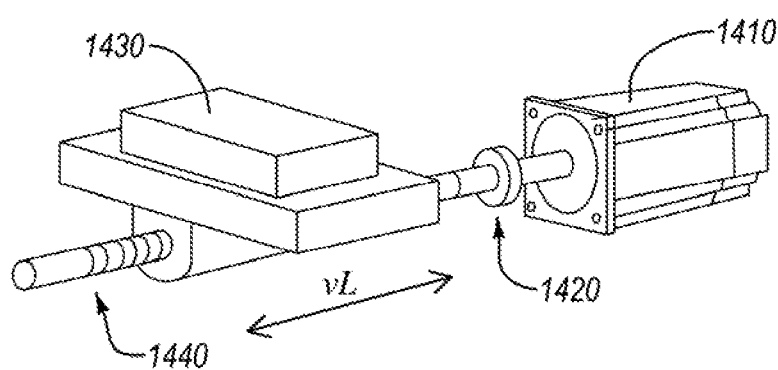
FIG. 14 illustrates a motor and linear motion section coupling for a CDPR according to an embodiment.

FIG. 14 illustrates a motor and linear motion section coupling for a CDPR according to an embodiment.

Referring to FIG. 14, a method for calculating a motor sizing for a CDPR is disclosed. The load torque may calculated using Equation 7.

$$T_L = \frac{(9.8\mu \cdot m + F) \cdot P_B}{2\pi R \cdot \eta} \qquad \text{Equation 7}$$

TL represent the Load Torque. F represents any external load force on the linear motion section. η represents the mechanical efficiency of the motor and gearbox 1410. μ represents the friction coefficient. M represent the linear motion section mass 1430, which is coupled to the motor via coupling 1420. R is the radius of the winch drum. $P_B$ represents the horizontal distance the load travels per turn of the ball screw 1440. In a conventional linear motion, this is known as the ball screw lead. This is the linear distance between the tops of each thread of the ball screw 1440.

However, the CDPR design may use a winch instead of a threaded rod for horizontal motion, which may affect the calculation for the distance traveled per turn. The distance the load travels per turn of the winch drum is not the distance between threads, but rather the length of cable that is wound in one turn of the winch drum. Therefore, in an embodiment, the circumference of the winch drum may be used for $P_B$.

Figure 15A:
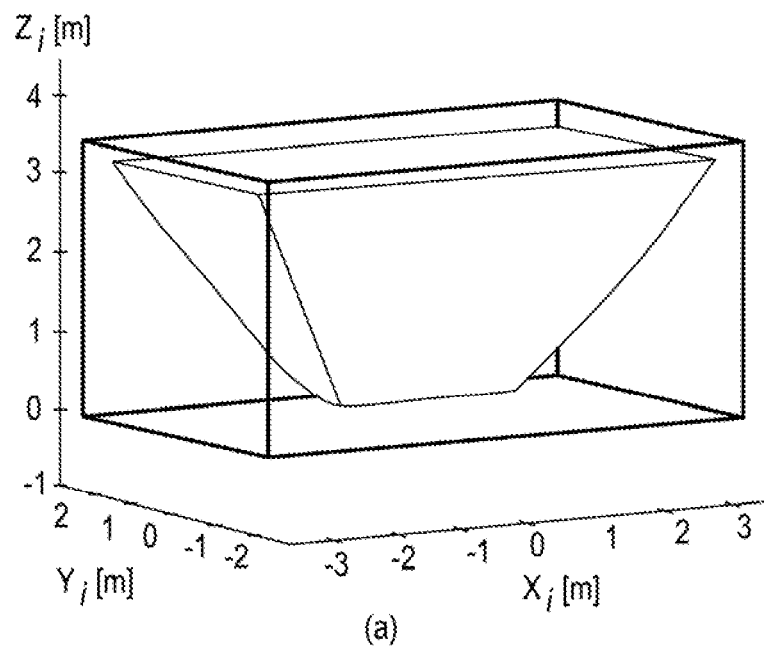
FIGS. 15A and 15B illustrate charts showing dynamic feasible workspaces for a CDPR according to an embodiment.
Figure 15B:
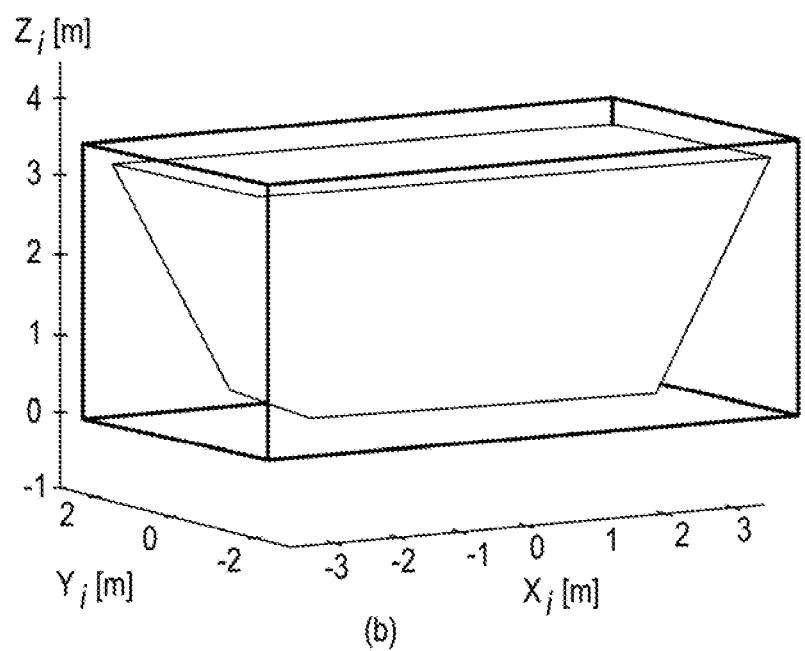

FIGS. 15A and 15B illustrate charts showing dynamic feasible workspaces for a CDPR according to an embodiment.

Better workspace utilization is expected over for two reasons. First, the weight bearing and stabilization (upper and lower) cable pairs act like a belt which can exert the same force on the manipulator at a position immediately touching the winch or at its farthest reach. This allows very high 2D horizontal workspace utilization. At no point in the plane are the cables approaching a vertical angle in relation to the manipulator which would cause tension to be too high. And at no point in the plane are any wires in collision.

Second, the vertical movement of the entire horizontal motion assembly makes the 2D horizontal motion available at any height in the workspace, so that utilization is translated to all the work area vertically.

Referring to FIGS. 15A and 15B, two CDPRs were studied with a dynamic feasible workspace (DFW), covering 47.96% of the volume in (a) and 63.27% of the volume in (b).

In embodiments, the CDPR is applicable and beneficial to various applications.

Construction Applications: Printing successive layers of concrete to form a building's structural shell and also architectural features and fixtures. Also, the 3D printing can print successive layers of foam, for instance a low rise polyurethane foam. For this a foam extrusion system such as the Constant Pressure Dispensing system may be used (described below).

Constant Pressure Dispensing System: The convenience of disposable foam kits meets the efficiency of bulk systems in the CPDS™ Series 2 from Touch 'n Seal. The CPDS Series 2 is a portable, constant pressure spray foam dispensing system that dispenses Class A fire retardant, thermal insulating and sound attenuating 2-component polyurethane spray foam—up to 2½ times as fast as foam kits. The nozzle of the Constant Pressure Dispenser could be attached to the printhead of the CDPR and the trigger mechanism could be controlled by an actuator which is operated by the CDPR controller.

Shotcrete: Once the foam has hardened, it is then sprayed with layers of concrete. This method of applying concrete is called shotcrete or gunite. Either wet mix or the dry mix applications of shotcrete could be handled by fixing the nozzle of the shotcrete system to the CDPR printhead. A particular advantage of the dry-mix shotcrete is that the hose weight is very low. Only a few ounces of concrete are in each foot of the hose as it is carried by large volumes of air flowing through the hose. Also, this is of particular advantage because the mixing of the concrete takes place in the air as it is sprayed with water and hits the surface as a mixture. This greatly reduces the hose cleaning time that is necessary when using the wet mix method as well as the simple pumping of concrete to build successive layers.

3D Printing Applications:

Garage sized Large Format 3D Printer—this embodiment utilizes the existing structure of the garage's walls as the structure onto which the vertical posts of CDPR are attached, eliminating the need for the vertical supports and utilizing the entire floor area of the garage as the print area. When not in use the cables can be either raised out of the work area and cars can be parked back in the garage, or the cables can be disconnected from the manipulator and fully wound onto the winch for storage.

3D printing of housewares and furniture, e.g., in-place cabinets, built-in bookcases, counters, fireplaces, pools, tubs, toilets, showers, sinks, fixture pedestals, and architectural features and ornaments. This avoids the transportation and installation costs of these items. These can be printed with plastic, ceramic, cementitious material, foam or composite.

Automobiles and automotive parts, planes and aerospace parts, boats and marine industry parts.

Printing of tiny homes in-situ or onto portable trailers.

Large sculptural 3d Printing of Plastics, Foams and Various materials—a low cost system could be capable of being the largest 3D printer in the world creating stadium-sized works of art.

3D Printed Construction—in-situ printing with cementitious materials, composite foams or other building materials. Integrated assembling of construction components within the 3D printing process.

Printing of in-place forms for concrete—these forms can be printed out of foam, plastic, concrete or another material. Then the forms are filled with concrete to provide structural strength to the building.

Material Handling Applications:

Automated Brick laying, block placement, laying of tile over large areas, spreading and application of grout.

Spreading and Application of Fire-Proofing Material

Warehouse order picking and inventory stocking—the cable robot is deployed with a workspace adjoining to a warehouse inventory rack, where it can pull items from shelves and place them into packaging. Load and stack packaging.

Manufacturing Assembly, Pick and Place

Fabrication Applications:

Welding of large surfaces or long joints where a welder is attached to the manipulator.

In place cutting of large materials such as stone or marble, or granite, or large manmade surfaces such as welded steel surfaces or sheet goods.

Sanding and polishing of large surfaces, sanding and polishing of floors,

Bridge Construction: spanning trenches or canyons.

Applications with a Camera Attached to the Manipulator:

Large scale Cinematographic applications where the manipulator moves the camera the camera to capture various angles or locations in the stadium or to follow a path in sports stadiums, with the attachment of a camera to the manipulator. An advantage over other cable robots in this design is the vertical stabilization and distribution of the weight of the camera more evenly across the four winches. This reduces cable tensions and allows the cables and motors to be smaller and more economical.

Using the same setup, this embodiment enables Highspeed Cinematographic applications for following complex camera routes through a scene. These routes can be pre-programmed into the controller of the robot as g-code and executed at the precise moment needed.

Applications in space and low gravity: Construction and Crane Operations in Space—especially in weightless environments. The stabilization in all directions is a distinct advantage over a traditional crane, which would be essentially inoperable in space.

Guidance and Alignment applications: Assisting with existing crane operations as a guidance and lateral stabilization system for the load being lifted and placed by the crane.

Side Mounted Applications—where the work surface is a vertical orientation:

A principal advantage of these applications is that a human workman would need to work on a ladder or scaffolding to complete this work without the assistance of the robot. In the past, these jobs were difficult to automate due to the heights, large workspaces and lateral spans involved.

Cleaning and Maintenance of Buildings—the robot is installed on the side of a building and the four posts are extended from the four corners of the wall. Then the robot moves the manipulator along the wall of the building with access to the entire wall surface.

Painting of Buildings—installation in the wall-cleaning configuration with a paint sprayer hose and nozzle of a paint sprayer system attached to the manipulator.

Sandblasting of buildings—wall cleaning configuration with a sand blasting hose and nozzle of a sandblasting system attached to the manipulator.

Window Cleaning of Buildings—cleaning configuration, tool attachment of water and solution sprayer and window squeegee, or pressure washer attached to the manipulator.

Painting and assembly of ships and aircraft—and hangars and in a drydock. With the attachment of a paint sprayer to the manipulator.

Underwater Cleaning of a ship's hull with the attachment of a barnacle scraper to the manipulator. The robot's frame is suspended in the water and attached to the ship's hull. The robot then moves the barnacle scraper along the surface of the ship's hull to remove barnacles in the work area.

High Speed Applications:

Launching, throwing or catching applications. Because of the light weight of the cables and manipulator, the quick movements enabled are applicable for high speed maneuvers such as catching objects in a net or robotic hand attached to the manipulator. This would be coupled with a machine vision system in order to inform the robot of where to position itself to catch the object.

Similarly, the fast movements of the manipulator could be used to launch, throw or otherwise accelerate objects which are attached to the manipulator.

Applications could include amusement park rides and G-force simulation where a seat or enclosure is attached to the manipulator in which a person or people sit or stand.

Human sized applications—In this embodiment, the robot's manipulator is attached to a position on the human body:

Medical rehabilitation and athletic training—In this application a person receiving physical rehabilitation or athletic training, is instructed to do a series of exercises to strengthen a muscle or muscle group. The manipulator may be a cuff or belt worn by the person, or a handle may be attached to the manipulator which the person grasps. As the person moves according to the exercise, the robot can give precise resistance to that movement to increase the effectiveness of the exercise. CDPR design provides servo motors that provide tension and force feedback to the controller which can then vary the force applied against the direction of the person's movement to provide the proper resistance.

Haptic environmental simulation for virtual or augmented reality—In this application, a cuff or belt is worn or handle grasped similarly to the previous example. However, the manipulator is instead moved by the robot to indicate haptic feedback to the user in a virtual or augmented reality application. When the user completes an action, the system responds by moving the manipulator to give resistance to the user's movement, or a signal movement or vibration pattern to provide indication of feedback to the user.

Field Sized Applications:

Agricultural applications such as automated farming of a plot of land, including the watering, planting of seeds, monitoring of plants, harvesting of plants, tilling and preparation of soil. This can all be accomplished without the driving of wheeled vehicles over the land.

The painting of an athletic field, mowing the grass of an athletic field.

Landscaping and construction site leveling with the attachment of landscaping and excavation tool attachments.

Room Sized Applications:

CoBot (Collaborative Robot) applications where the cable robot acts in the 2D workspace above the human workspace, allowing only the manipulator or tool arm to be suspended within the human workspace. This could be especially useful in small areas such as a kitchen, where the floor space for human foot traffic is a priority. Vertical motion could be contained solely in a vertically actuated rod extending down from the manipulator.

Kitchen CoBot, Workshop CoBot, any CoBot application where a suspended robotic manipulator would be preferable over a ground-based manipulator.

For instance, the Kitchen CoBot can assist in the cooking of food, serving of food, cleaning and storage of dishes.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The present disclosure, in various aspects, embodiments, and/or configurations, includes components, methods, processes, systems and/or apparatuses substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this description, with each claim standing on its own as a separate preferred embodiment of the disclosure.

Moreover, though the description has included a description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A cable-driven parallel robot (CDPR), comprising:
   a first rotor coupled to a first support, the first rotor positioned above a surface;
   a second rotor coupled to a second support, the second rotor positioned above the surface;
   an effector positioned at a horizontal planar location between the first rotor and the second rotor and at a vertical location above the surface;
   a first set of cables coupled to the first rotor at first ends of the first set of cables and to the effector at second ends of the first set of cables; and
   a second set of cables coupled to the second rotor at first ends of the second set of cables and to the effector at second ends of the second set of cables;
   wherein the first rotor controls tension to the first set of cables and the second rotor controls tension to the second set of cables for moving the horizontal planar location, and
   wherein the first rotor is vertically movable on the first support with the second rotor is vertically movable on the second support for moving the vertical location when the first rotor is vertically moved on the first support synchronous to the second rotor being vertically moved on the second support, and
   wherein at least one of the first rotor comprises a winch drum, wherein the winch drum comprises a first set of grooves and a second set of grooves across a portion of length of the winch drum, wherein the first set of grooves is placed at an opposite orientation from the second set of grooves, and wherein the winch drum is configured to coil at least one cable of the first set of cables or the second set of cables using the first set of grooves and at least another cable of one of the first set of cables or the second set of cables using the second set of grooves.

2. The CDPR of claim 1, wherein at least one cable of the first set of cables and the second set of cables is coupled to an upper portion of the effector and at least another one cable of each set of the first set of cables and the second set of cables is coupled to a lower portion of the effector.

3. The CDPR of claim 1, wherein at least one cable of the first set of cables and the second set of cables is coupled to an upper portion of the effector and at least another one cable of the first set of cables and the second set of cables is coupled to a lower portion of the effector, and wherein a first end of the at least one cable is coupled to an upper portion of one of the first rotor and the second rotor and a first end of the at least another one cable is coupled to a lower portion of one of the first rotor and the second rotor.

4. The CDPR of claim 1, wherein at least one cable of each set of the first set of cables and the second set of cables is coupled to an upper portion of the effector and at least another one cable of each set of the first set of cables and the second set of cables is coupled to a lower portion of the effector.

5. The CDPR of claim 1, wherein at least one cable of at least one set of the first set of cables and the second set of cables is coupled to an upper portion of the effector and at least another one cable of the at least one set of the first set of cables and the second set of cables is coupled to a lower portion of the effector, wherein a first end of the at least one cable of at least one set of the first set of cables and the second set of cables is coupled to a lower portion of one of the first rotor and the second rotor and a first end of the at least another one cable of at least one set of the first set of cables and the second set of cables is coupled to an upper portion of one of the first rotor and the second rotor, wherein at least one cable of at least another set of the first set of cables and the second set of cables is coupled to an upper portion of the effector and at least another one cable of the at least another set of the first set of cables and the second set of cables is coupled to a lower portion of the effector, and wherein a first end of the at least another cable of the at least another set of the first set of cables and the second set of cables is coupled to an upper portion of a rotor and a first end of the at least another one cable is coupled to a lower portion of one of the first rotor and the second rotor.

6. The CDPR of claim 1, further comprising at least one pulley,
  wherein at least one cable of the first set of cables and the second set of cables is coupled to one of the first rotor and the second rotor via a pulley.

7. The CDPR of claim 1, further comprising at least one thread hole;
  wherein at least one cable of the first set of cables and the second set of cables is coupled to one of the first rotor and the second rotor through a thread hole.

8. The CDPR of claim 1, further comprising at least one laser configured for measuring a distance of the effector.

9. The CDPR of claim 1, further comprising at least one laser configured for measuring a distance of the effector and at least one reflector coupled to the effector.

10. The CDPR of claim 1, wherein at least one of the first rotor and the second rotor comprises a winch drum.

11. The CDPR of claim 1, wherein at least one of the first rotor and the second rotor comprises a winch drum, wherein the winch drum is configured to coil at least one of cable of the first set of cables and the second set of cables for adjusting a length of the at least one cable.

12. The CDPR of claim 1, wherein at least one of the first rotor and the second rotor comprises a winch drum, and wherein the winch drum is configured to coil at least one cable of the first set of cables and the second set of cables.

13. The CDPR of claim 1, wherein one of the first rotor and the second rotor comprises a winch drum, wherein the winch drum comprises a set of grooves, and wherein each of the set of grooves is offset at an angle along the length of the winch drum.

14. The CDPR of claim 1, wherein at least one of the first rotor and second rotor comprises a winch drum, wherein the winch drum comprises a set of grooves, wherein each of the set of grooves is offset at an angle along the length of the winch drum, and wherein one of the first set of cables and the second set of cables are offset at the angle to a plane of the horizontal planar location.

15. The CDPR of claim 1, further comprising computational equipment configured for controlling at least one of the first rotor and the second rotor.

16. A cable-driven parallel robot (CDPR), comprising:
  a first set of rotors coupled to a first support, the first set of rotors positioned above a surface;
  a second set of rotors coupled to a second support, the second set of rotors positioned above the surface;
  an effector positioned at a horizontal planar location between the first set of the rotors and the second set of rotors and at a vertical location above the surface;
  a first set of cables coupled to the first set of rotors at first ends of the first set of cables and to the effector at second ends of the first set of cables; and
  a second set of cables comprising at least two cables is coupled to the second set of rotors at first ends of the second set of cables and to the effector at second ends of the second set of cables;
  wherein the first set of rotors controls tension to the first set of cables and the second set of rotors controls tension to the second set of cables for moving the horizontal planar location,
  wherein the first set of rotors is vertically movable on the first support with the second set of rotors is vertically movable on the second support for moving the vertical location when the first set of rotors is vertically moved on the first support synchronous to the second set of rotors being vertically moved on the second support, and
  wherein at least one of the first set of rotors comprises a winch drum, wherein the winch drum comprises a first set of grooves and a second set of grooves across a portion of length of the winch drum, wherein the first set of grooves is placed at an opposite orientation from the second set of grooves, and wherein the winch drum is configured to coil at least one cable of the first set of cables or the second set of cables using the first set of grooves and at least another cable of one of the first set of cables or the second set of cables using the second set of grooves.

17. The CDPR of claim 16, wherein each set of the first set of rotors and the second set of rotors comprise two rotors, and
  wherein at least one cable of the first set of cables and the second set of cables is coupled to one of the two rotors.

18. A method of controlling a cable-driven parallel robot (CDPR), comprising:
  providing the cable-driven parallel robot (CDPR), comprising a first set of rotors coupled to a first support, the first set of rotors positioned above a surface; a second set of rotors coupled to a second support, the second set of rotors positioned above the surface; an effector positioned at a horizontal planar location between the first set of rotors and the second set of rotors and at a vertical location above the surface; a first set of cables coupled to the first set of rotors at first ends of the first set of cables and to the effector at second ends of the first set of cables; and a second set of cables comprising at least two cables is coupled to the second set of rotors at first ends of the second set of cables and to the effector at second ends of the second set of cables, wherein the first set of rotors controls tension to the first set of cables and the second set of rotors controls tension to the second set of cables for moving the horizontal planar location, wherein the first set of rotors is vertically movable on the first support with the second set of rotors is vertically movable on the second support for moving the vertical location when the first set of rotors is vertically moved on the first support synchronous to the second set of rotors being vertically moved on the second support, and wherein at least one of the first set of rotors comprises a winch drum, wherein the winch drum comprises a first set of grooves and a second set of grooves across a portion of length of the winch drum, wherein the first set of grooves is placed at an opposite orientation from the second set of grooves, and wherein the winch drum is configured to coil at least one cable of the first set of cables or the second set of cables using the first set of grooves and at least another cable of one of the first set of cables or the second set of cables using the second set of grooves;

moving the effector by controlling tension to each of the first set of cables and second set of cables; and moving the effector by controlling the first set of rotors and the second set of rotors.

19. The method of claim 18, wherein the effector comprises a printhead.

* * * * *